(12) United States Patent
Yamamoto

(10) Patent No.: US 10,964,044 B2
(45) Date of Patent: Mar. 30, 2021

(54) METHOD OF OPERATING MEASUREMENT DEVICE, MEASUREMENT DEVICE, AND RECORDING MEDIUM

(71) Applicant: OLYMPUS CORPORATION, Tokyo (JP)

(72) Inventor: Naoki Yamamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/533,898

(22) Filed: Aug. 7, 2019

(65) Prior Publication Data
US 2020/0074666 A1 Mar. 5, 2020

(30) Foreign Application Priority Data
Aug. 30, 2018 (JP) .............................. JP2018-161851

(51) Int. Cl.
| | |
|---|---|
| *G06T 7/00* | (2017.01) |
| *G06T 7/62* | (2017.01) |
| *H04N 7/18* | (2006.01) |
| *G06T 7/50* | (2017.01) |
| *G01B 11/02* | (2006.01) |

(52) U.S. Cl.
CPC .............. *G06T 7/62* (2017.01); *G01B 11/022* (2013.01); *G06T 7/001* (2013.01); *G06T 7/50* (2017.01); *H04N 7/183* (2013.01); *G06T 2207/10068* (2013.01); *G06T 2207/30108* (2013.01)

(58) Field of Classification Search
CPC . H04N 13/00; H04N 5/00; H04N 7/00; G06T 17/00; G06T 2200/00; G06T 7/00
See application file for complete search history.

(56) References Cited

U.S. PATENT DOCUMENTS

| | | | |
|---|---|---|---|
| 2007/0058175 A1* | 3/2007 | Maierhofer | .......... G01B 11/002 356/601 |
| 2007/0165306 A1* | 7/2007 | Bendall | ..................... A61B 1/05 359/464 |
| 2016/0335809 A1* | 11/2016 | Forutanpour | ........... G06T 7/579 |
| 2019/0188842 A1* | 6/2019 | Sakamoto | .......... G01B 11/2545 |
| 2020/0053296 A1* | 2/2020 | Endo | ...................... H04N 5/272 |

FOREIGN PATENT DOCUMENTS

| | | |
|---|---|---|
| JP | 2005-189052 A | 7/2005 |
| JP | 4372328 B2 | 11/2009 |

\* cited by examiner

*Primary Examiner* — Maryam A Nasri
(74) *Attorney, Agent, or Firm* — Scully, Scott, Murphy & Presser, P.C.

(57) ABSTRACT

In a method of operating a measurement device, an image acquisition unit acquires a first image of a subject. A display control unit displays the first image or a second image regarding the first image on a display. A reading unit reads one or more pieces of reference information from a storage medium. The reference information represents two reference positions on the subject. The display control unit displays the one or more pieces of reference information on the display. A setting unit sets two reference positions on the first image or the second image after the first image or the second image is displayed on the display and the reference information is displayed on the display.

20 Claims, 31 Drawing Sheets

METHOD OF OPERATING MEASUREMENT DEVICE, MEASUREMENT DEVICE, AND RECORDING MEDIUM

BACKGROUND OF THE INVENTION

Field of the Invention

The present invention relates to a method of operating a measurement device, a measurement device, and a recording medium.

Priority is claimed on Japanese Patent Application No. 2018-161851, filed on Aug. 30, 2018, the content of which is incorporated herein by reference.

Description of Related Art

Industrial endoscope devices have been used for observation and inspection of internal damage, corrosion, and the like of boilers, pipes, aircraft engines, and the like. In such an endoscope device, a plurality of types of optical adapters for observing and inspecting various objects to be observed are prepared. Optical adapters are provided at the tips of endoscopes and are exchangeable. In inspection using such an endoscope device, there is a desire to quantitatively measure the size of the defect and damage of a subject. To meet such a desire, an endoscope device provided with a three-dimensional measurement function is present.

Conventional products are provided with a function to execute measurement using the method called as scaler measurement or reference length measurement. In the method, two points of a reference object having a known length within an observation screen are set as reference positions and a length between the two points are set as a reference value (a reference size). Thereafter, a measurement position is set and a length of a measurement object is measured on the basis of the reference value.

In the scaler measurement or the reference length measurement, measurement accuracy is high when a reference object and a measurement object are present on a common plane perpendicular to an optical axis. However, measurement accuracy is low when an image of an object having a deep portion is used. A measurement method (3D scaler measurement) in which a technology called as structure from motion and input of a reference value are combined has been disclosed. Three-dimensional measurement using images captured with a single eye becomes possible by using this measurement method.

A system that restores a three-dimensional shape of an object using the 3D scaler measurement is disclosed in Japanese Patent Publication No. 4372328. In the system disclosed in Japanese Patent Publication No. 4372328, a three-dimensional shape is restored using the following method. A plurality of images are acquired through imaging at different angles. A feature point is extracted from each of the plurality of images. A plurality of feature points are associated with each other. Data of a length of one portion in an image is given. A three-dimensional shape is restored on the basis of the length of the portion and the position relationship of points on the surface of an object in the three-dimensional space.

SUMMARY OF THE INVENTION

According to a first aspect of the present invention, a method of operating the measurement device includes an image acquisition step, a first display step, a reading step, a second display step, a setting step, and a measurement step. The image acquisition unit acquires a first image of a subject in the image acquisition step. The display control unit displays the first image or a second image regarding the first image on a display in the first display step. The reading unit reads one or more pieces of reference information from a storage medium in the reading step. The reference information represents two reference positions on the subject. The two reference positions define a reference value of a size of the subject. The storage medium stores the one or more pieces of reference information. The display control unit displays the one or more pieces of reference information on the display in the second display step. The setting unit sets two reference positions on the first image or the second image in the setting step after the first image or the second image is displayed on the display and the reference information is displayed on the display. The measurement unit measures the size of the subject on the basis of the two reference positions set on the first image or the second image, two or more measurement positions set on the image on which the two reference positions are set, and the reference value in the measurement step.

According to a second aspect of the present invention, in the first aspect, the reference value may be associated with the reference information. The display control unit may display the reference information and the reference value on the display in the second display step.

According to a third aspect of the present invention, in the first aspect, the method of operating the measurement device may further include a selection step in which a selection unit selects one piece of reference information designated by a user from the reference information displayed on the display. The reference value may be associated with the reference information. The measurement unit may use the reference value associated with the reference information selected by the selection unit in the measurement step.

According to a fourth aspect of the present invention, in the first aspect, the storage medium may be configured to store the one or more pieces of reference information for each of a plurality of subjects. The reading unit may read the one or more pieces of reference information for one subject included in the plurality of subjects from the storage medium on the basis of information of the one subject in the reading step.

According to a fifth aspect of the present invention, in the first aspect, the method of operating the measurement device may further include an identification step in which an identification unit identifies the two reference positions in the first image or the second image.

According to a sixth aspect of the present invention, in the fifth aspect, the method of operating the measurement device may further include a third display step in which the display control unit displays reference position information that represents the two reference positions identified by the identification unit on the display.

According to a seventh aspect of the present invention, in the fifth aspect, the reference information may be an image of a reference object including the two reference positions.

According to an eighth aspect of the present invention, in the seventh aspect, the identification unit may identify a similar region that is in the first image or the second image and is the most similar to the image of the reference object, and identify the two reference positions of the similar region on the basis of the two reference positions of the image of the reference object in the identification step.

According to a ninth aspect of the present invention, in the fifth aspect, the method of operating the measurement device may further include a restoration step in which a restoration unit restores a three-dimensional shape of the subject. The reference information may be associated with a three-dimensional shape of a reference object including the two reference positions. The identification unit may identify a similar region that is in the three-dimensional shape of the subject and is the most similar to the three-dimensional shape of the reference object, and identify the two reference positions of the similar region on the basis of the two reference positions of the three-dimensional shape of the reference object in the identification step.

According to a tenth aspect of the present invention, in the seventh aspect, the method of operating the measurement device may further include a selection step in which a selection unit selects a region designated by a user in the first image or the second image displayed on the display as a designation region. The identification unit may identify the image of the reference object that is the most similar to the designation region, and identify the two reference positions of the designation region on the basis of the two reference positions of the identified image in the identification step.

According to an eleventh aspect of the present invention, a measurement device includes an image acquisition unit, a reading unit, a display control unit, a setting unit, and a measurement unit. The image acquisition unit is configured to acquire a first image of a subject. The reading unit is configured to read one or more pieces of reference information from a storage medium. The reference information represents two reference positions on the subject. The two reference positions define a reference value of a size of the subject. The storage medium is configured to store the one or more pieces of reference information. The display control unit is configured to display the first image or a second image regarding the first image on a display, and display the one or more pieces of reference information on the display. The setting unit is configured to set two reference positions on the first image or the second image after the first image or the second image is displayed on the display and the reference information is displayed on the display. The measurement unit is configured to measure the size of the subject on the basis of the two reference positions set on the first image or the second image, two or more measurement positions set on the image on which the two reference positions are set, and the reference value.

According to a twelfth aspect of the present invention, in the eleventh aspect, the reference value may be associated with the reference information. The display control unit may be configured to display the reference information and the reference value on the display.

According to a thirteenth aspect of the present invention, in the eleventh aspect, the measurement device may further include a selection unit configured to select one piece of reference information designated by a user from the reference information displayed on the display. The reference value may be associated with the reference information. The measurement unit may be configured to use the reference value associated with the reference information selected by the selection unit.

According to a fourteenth aspect of the present invention, in the eleventh aspect, the storage medium may be configured to store the one or more pieces of reference information for each of a plurality of subjects. The reading unit may be configured to read the one or more pieces of reference information for one subject included in the plurality of subjects from the storage medium on the basis of information of the one subject.

According to a fifteenth aspect of the present invention, in the eleventh aspect, the measurement device may further include an identification unit configured to identify the two reference positions in the first image or the second image.

According to a sixteenth aspect of the present invention, in the fifteenth aspect, the reference information may be an image of a reference object including the two reference positions.

According to a seventeenth aspect of the present invention, in the sixteenth aspect, the identification unit is configured to identify a similar region that is in the first image or the second image and is the most similar to the image of the reference object, and identify the two reference positions of the similar region on the basis of the two reference positions of the image of the reference object.

According to an eighteenth aspect of the present invention, in the fifteenth aspect, the measurement device may further include a restoration unit configured to restore a three-dimensional shape of the subject. The reference information may be associated with a three-dimensional shape of a reference object including the two reference positions. The identification unit may be configured to identify a similar region that is in the three-dimensional shape of the subject and is the most similar to the three-dimensional shape of the reference object, and identify the two reference positions of the similar region on the basis of the two reference positions of the three-dimensional shape of the reference object.

According to a nineteenth aspect of the present invention, in the sixteenth aspect, the measurement device may further include a selection unit configured to select a region designated by a user in the first image or the second image displayed on the display as a designation region. The identification unit may be configured to identify the image of the reference object that is the most similar to the designation region, and identify the two reference positions of the designation region on the basis of the two reference positions of the identified image.

According to a twentieth aspect of the present invention, a non-transitory computer-readable recording medium saves a program for causing a computer to execute an image acquisition step, a first display step, a reading step, a second display step, a setting step, and a measurement step. The computer acquires a first image of a subject in the image acquisition step. The computer displays the first image or a second image regarding the first image on a display in the first display step. The computer reads one or more pieces of reference information from a storage medium, the reference information representing two reference positions on the subject, the two reference positions defining a reference value of a size of the subject, the storage medium storing the one or more pieces of reference information in the reading step. The computer displays the one or more pieces of reference information on the display in the second display step. The computer sets two reference positions on the first image or the second image in the setting step after the first image or the second image is displayed on the display and the reference information is displayed on the display. The computer measures the size of the subject on the basis of the two reference positions set on the first image or the second image, two or more measurement positions set on the image on which the two reference positions are set, and the reference value in the measurement step.

DETAILED DESCRIPTION OF THE INVENTION

Hereinafter, embodiments of the present invention will be described with reference to the drawings. Hereinafter, an example in which a measurement device is an endoscope device will be described. The measurement device has only to be a device having a measurement function and is not limited to an endoscope device. An object for measurement is an industrial product.

First Embodiment

Figure 1:
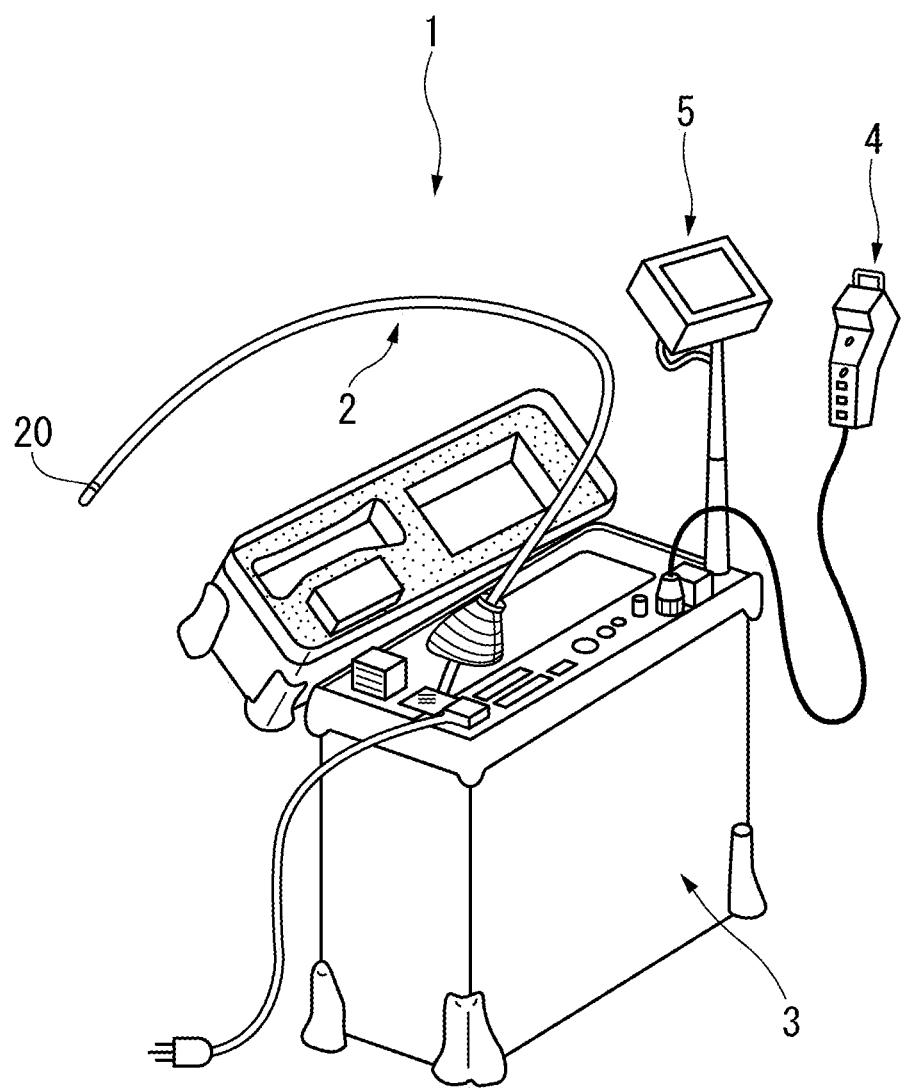
FIG. 1 is a perspective view showing an entire configuration of an endoscope device according to a first embodiment of the present invention.
Figure 2:
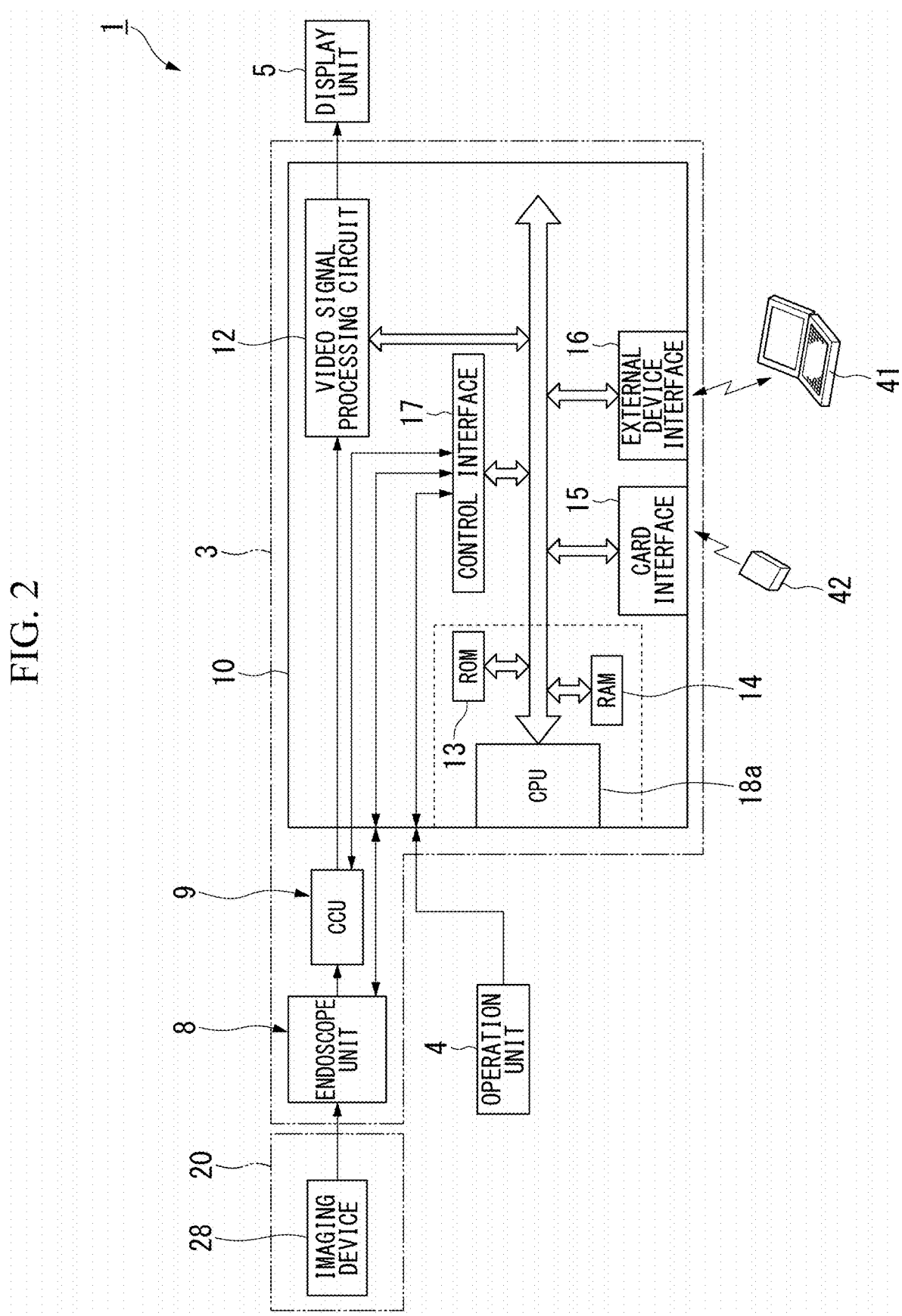
FIG. 2 is a block diagram showing an internal configuration of an endoscope device according to the first embodiment of the present invention.

FIG. 1 shows an entire configuration of an endoscope device 1 (measurement device) according to a first embodiment of the present invention. FIG. 2 shows an internal configuration of the endoscope device 1. The endoscope device 1 images a subject and measures geometrical features of the subject using images. In order to observe and measure various subjects, an inspector can perform replacement of an optical adaptor mounted at a tip end 20 of an insertion unit 2, selection of a built-in measurement processing program, and addition of a measurement processing program.

The endoscope device 1 shown in FIG. 1 includes the insertion unit 2, a main body unit 3, an operation unit 4, and a display unit 5.

The insertion unit 2 is inserted into the inside of a subject. The insertion unit 2 has a long and thin bendable tube shape from the tip end 20 to a base end portion. The insertion unit 2 images a measurement part and outputs an imaging signal to the main body unit 3. An optical adapter is mounted on the tip end 20 of the insertion unit 2. The main body unit 3 is a control device including a housing unit that houses the insertion unit 2. The operation unit 4 accepts a user's operation for the endoscope device 1. The display unit 5 includes a display screen and displays an image of a subject acquired by the insertion unit 2, an operation menu, and the like on the display screen.

The operation unit 4 is a user interface. For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated.

The main body unit 3 shown in FIG. 2 includes an endoscope unit 8, a camera control unit (CCU) 9, and a control device 10. The endoscope unit 8 includes a light source device and a bending device not shown in the drawing. The light source supplies illumination light that is necessary for observation. The bending device bends a bending mechanism which is not shown in the drawing. An imaging device 28 is built into the tip end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. An imaging signal output from the imaging device 28 is input to the CCU 9. The CCU 9 executes a pre-process including amplification, noise elimination, and the like for the imaging signal acquired by the imaging device 28. The CCU 9 converts the imaging signal for which the pre-process has been executed into a video signal such as an NTSC signal.

The control device 10 includes a video signal processing circuit 12, a read only memory (ROM) 13, a random access memory (RAM) 14, a card interface 15, an external device interface 16, a control interface 17, and a central processing unit (CPU) 18a.

The video signal processing circuit 12 performs predetermined video processing on the video signal output from the CCU 9. For example, the video signal processing circuit 12 performs video processing related to improvement of visibility. For example, the video processing is color reproduction, gray scale correction, noise suppression, contour enhancement, and the like. The video signal processing circuit 12 also performs a process for improving measurement performance when measurement is executed. In addition, the video signal processing circuit 12 combines the video signal output from the CCU 9 and a graphic image signal generated by the CPU 18a. The graphic image signal includes an image of the operation screen, measurement information, and the like. The measurement information includes a measurement result and the like. The video signal processing circuit 12 outputs a combined video signal to the display unit 5. In addition, the video signal processing circuit 12 outputs image data based on the video signal output from the CCU 9 to the CPU 18a.

The ROM 13 is a nonvolatile recording medium on which a program for the CPU 18a to control the operation of the endoscope device 1 is recorded. The RAM 14 is a volatile recording medium that temporarily stores information used by the CPU 18a for controlling the endoscope device 1. The CPU 18a controls the operation of the endoscope device 1 on the basis of a program recorded in the ROM 13.

A memory card 42 that is a removable recording medium is connected to the card interface 15. The card interface 15 inputs control processing information, image information, and the like stored in the memory card 42 to the control device 10. In addition, the card interface 15 records the control processing information, the image information, and the like generated by the endoscope device 1 in the memory card 42.

An external device such as a USB device is connected to the external device interface 16. For example, a personal computer 41 is connected to the external device interface 16. The external device interface 16 transmits information to the personal computer 41 and receives information from the personal computer 41. Accordingly, a monitor of the personal computer 41 can display information. In addition, by inputting an instruction to the personal computer 41, a user can perform an operation related to control of the endoscope device 1.

The control interface 17 performs communication with the operation unit 4, the endoscope unit 8, and the CCU 9 for operation control. The control interface 17 notifies the CPU 18a of an instruction input to the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18a may be recorded on a computer-readable recording medium. The program recorded on this recording medium may be read and executed by a computer other than the endoscope device 1. For example, the program may be read and executed by the personal computer 41. The personal computer 41 may control the endoscope device 1 by transmitting control information used for controlling the endoscope device 1 to the endoscope device 1 in accordance with a program. Alternatively, the personal computer 41 may acquire a video signal from the endoscope device 1 and perform measurement using the acquired video signal.

The program described above may be transmitted from the computer storing the program to the endoscope device 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). A combination of a program that has already been recorded in a computer and a differential program may realize the functions described above.

As described above, the endoscope device 1 includes the imaging device 28 (image acquisition unit) and the CPU 18a. The imaging device 28 images a subject and generates an imaging signal. The imaging signal includes an image of the subject. Therefore, the imaging device 28 acquires the image of the subject generated by capturing the image of the subject. The image generated by the imaging device 28 is input to the CPU 18a through the video signal processing circuit 12.

The imaging device 28 has a function of an image acquisition unit that acquires an image of a subject. The image acquisition unit may be an image input device. For example, in a case where the personal computer 41 operates as a measurement device, the image acquisition unit is a communication interface (communicator) that performs communication with the endoscope device 1. The image acquisition unit may be a wireless communicator. The image acquisition unit may be a circuit that reads an image from a recording medium in which the image is stored.

Figure 3:
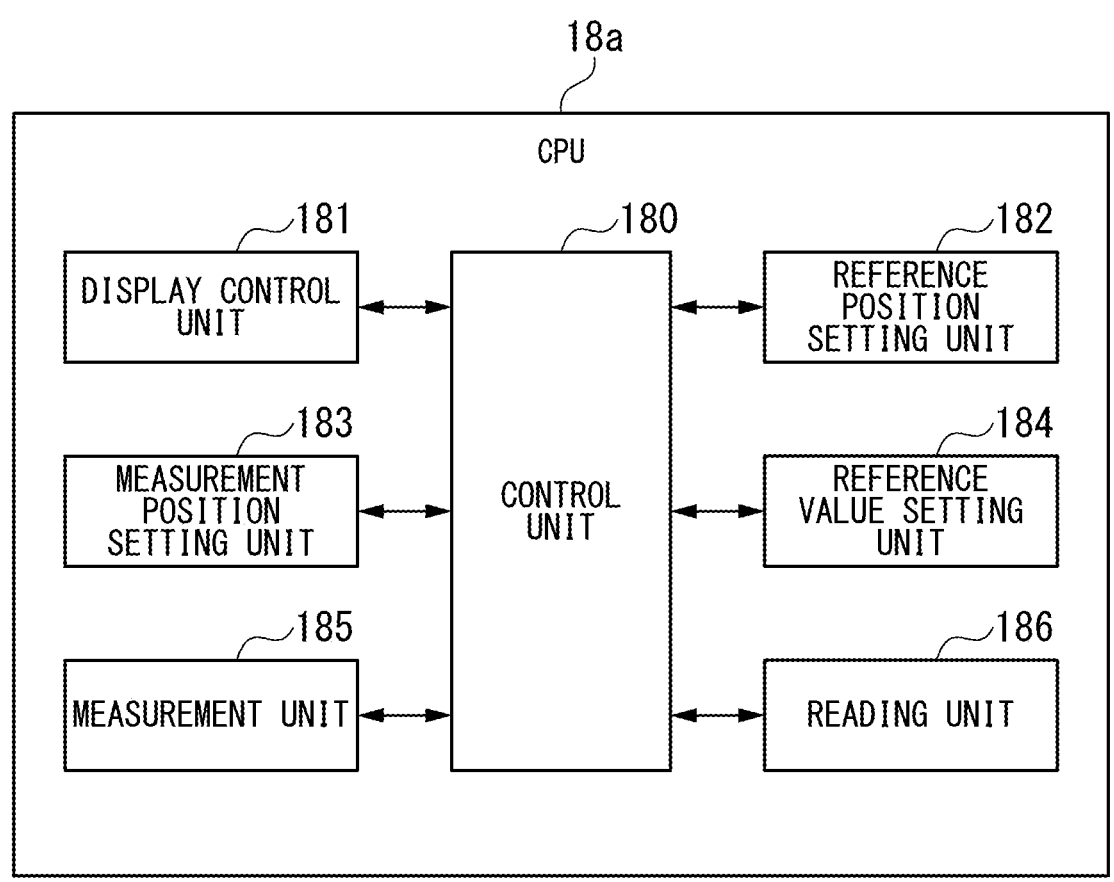
FIG. 3 is a block diagram showing a functional configuration of a CPU according to the first embodiment of the present invention.

FIG. 3 shows a functional configuration of the CPU 18a. The functions of the CPU 18a are constituted by a control unit 180, a display control unit 181, a reference position setting unit 182, a measurement position setting unit 183, a reference value setting unit 184, a measurement unit 185, and a reading unit 186. At least one of the blocks shown in FIG. 3 may be constituted by a circuit different from the CPU 18a.

Each unit shown in FIG. 3 may be constituted by at least one of a processor and a logic circuit. For example, the processor is at least one of a CPU, a digital signal processor (DSP), and a graphics processing unit (GPU). For example, the logic circuit is at least one of an application specific integrated circuit (ASIC) and a field-programmable gate array (FPGA). Each unit shown in FIG. 3 may include one or a plurality of processors. Each unit shown in FIG. 3 may include one or a plurality of logic circuits.

An outline of the configuration shown in FIG. 3 will be described. The reading unit 186 reads one or more pieces of reference information from a storage medium. The reference information represents two reference positions on a subject. The two reference positions define a reference value of a size of the subject. The storage medium stores the one or more pieces of reference information. The display control unit 181 displays a first image of the subject or a second image regarding the first image on the display unit 5 and displays the one or more pieces of reference information on the display unit 5. After the first image or the second image is displayed on the display unit 5 and the reference information is displayed on the display unit 5, the reference position setting unit 182 sets two reference positions on the first image or the second image. The measurement unit 185 measures the size of the subject on the basis of the two reference positions set on the first image or the second image, two or more measurement positions set on the image on which the two reference positions are set, and the reference value.

For example, the first image is an image acquired by the imaging device 28 and displayed on the display unit 5. For example, the second image is an image of a three-dimensional shape of a subject generated from the first image. In a sixth embodiment described later, an example in which the second image is used will be described.

Details of the configuration shown in FIG. 3 will be described. The control unit 180 controls a process executed by each unit. The display control unit 181 displays an image that is acquired by the imaging device 28 and is displayed on the display unit 5. For example, the display control unit 181 controls a process executed by the video signal processing circuit 12. The display control unit 181 causes the video signal processing circuit 12 to output a processed image to the display unit 5. The display unit 5 displays the image output from the video signal processing circuit 12.

The display control unit 181 displays various kinds of information on the display unit 5. In other words, the display control unit 181 displays various kinds of information on an image. Various kinds of information include reference information, a cursor, a mark, and the like. The cursor is a pointer used by a user for designating a specific position on an image. The mark represents a position designated on an image by a user. For example, the display control unit 181 generates a graphic image signal of various kinds of information. The display control unit 181 outputs the generated graphic image signal to the video signal processing circuit 12. The video signal processing circuit 12 composes a video signal output from the CCU 9 and a graphic image signal output from the CPU 18a. In this way, various kinds of information are superimposed on an image. The video signal processing circuit 12 outputs the composed video signal to the display unit 5. The display unit 5 displays the image on which various kinds of information are superimposed.

For example, reference information is an image of a reference object including two reference positions. For example, reference information is an image of a predetermined region that is to be a reference object in a standard product. Predetermined regions of an image used for inspection may be registered as reference information. Two reference positions define a known length. A three-dimensional distance between two reference positions represents a reference value. A user has only to be able to view two reference positions on an image of a reference object. Reference information does not need to include coordinate information of two reference positions. A mark such as an arrow representing two reference positions may be superimposed on an image of a reference object.

A user inputs position information of a cursor to the operation unit 4 by operating the operation unit 4. The operation unit 4 accepts position information that is input to the operation unit 4 by a user and outputs the position information. The position information input to the operation unit 4 is input to the control interface 17 that is an input unit. The position information input to the control interface 17 is input to the CPU 18a. The display control unit 181 detects a position represented by the position information input to the operation unit 4. The display control unit 181 displays a cursor at the position represented by the position information input to the operation unit 4. In a case where the display unit 5 is a touch panel, in other words, the display unit 5 and the operation unit 4 are integrated, a user inputs the position information of the cursor to the operation unit 4 by touching the screen of the display unit 5.

A user inputs position information of reference positions to the operation unit 4 by operating the operation unit 4. The operation unit 4 accepts position information input by a user and outputs the position information. The position information input to the operation unit 4 is input to the CPU 18a through the control interface 17. The reference position setting unit 182 sets reference positions at positions represented by the position information on an image that is acquired by the imaging device 28 and is displayed on the display unit 5. The position information of the reference positions set by the reference position setting unit 182 is stored in the RAM 14. The reference positions are set by associating the reference positions with a specific image.

After a first image or a second image is displayed on the display unit 5 and reference information is displayed on the display unit 5, the measurement position setting unit 183 sets two or more measurement positions on the first image or the second image. A user inputs position information of measurement positions to the operation unit 4 by operating the operation unit 4. The operation unit 4 accepts position information input by a user and outputs the position information. The position information input to the operation unit 4 is input to the CPU 18*a* through the control interface 17. The measurement position setting unit 183 sets measurement positions at positions represented by the position information on an image that is acquired by the imaging device 28 and is displayed on the display unit 5. The position information of the measurement positions set by the measurement position setting unit 183 is stored in the RAM 14. The measurement positions are set by associating the measurement positions with a specific image.

A reference position (reference point) and a measurement position (measurement point) are coordinate information of a target position determined on the basis of a user's instruction. Designation of reference positions or measurement positions means that a user instructs the endoscope device 1 of the reference positions or the measurement positions. A user designates a reference position or a measurement position using the cursor. Alternatively, a user designates a reference position or a measurement position by touching the reference position or the measurement position on the screen of the display unit 5. The setting of a reference position means that the reference position setting unit 182 associates the reference position with an image. The setting of a measurement position means that the measurement position setting unit 183 associates the measurement position with an image.

A user inputs a reference value to the operation unit 4 by operating the operation unit 4. The operation unit 4 accepts the reference value input to the operation unit 4 by a user and outputs the reference value. The reference value input to the operation unit 4 is input to the CPU 18*a* through the control interface 17. When the reference value is input to the operation unit 4, the reference value setting unit 184 sets the reference value to the endoscope device 1 by associating the reference value with an image that is acquired by the imaging device 28 and is displayed on the display unit 5. The reference value set by the reference value setting unit 184 is stored in the RAM 14. The reference value is set by associating the reference value with a specific image. The designation of a reference value means that a user instructs the endoscope device 1 of the reference value. The setting of a reference value means that the reference value setting unit 184 associates the reference value with an image.

The measurement unit 185 executes three-dimensional measurement of a subject using images acquired by the imaging device 28. For example, the measurement unit 185 restores a three-dimensional shape of the subject on the basis of structure from motion. Hereinafter, structure from motion will be abbreviated to SfM. The measurement unit 185 measures a size of a subject defined by two or more measurement positions on the basis of two reference positions and a reference value. The size of a subject is a distance between two points, the area of a region surrounded by three or more points, or the like. The measurement unit 185 may execute scaler measurement in which SfM is not used.

The reading unit 186 reads reference information from a storage medium that stores the reference information. Specifically, the reading unit 186 reads reference information from the RAM 14. For example, the memory card 42 stores reference information. The reference information is transmitted from the memory card 42 to the RAM 14 through the card interface 15. The personal computer 41 may store reference information. Reference information may be transmitted from the personal computer 41 to the RAM 14 through the external device interface 16. A server (cloud server or the like) on a network may store reference information. The reference information may be transmitted from the server to the RAM 14 through the external device interface 16.

Figure 4:
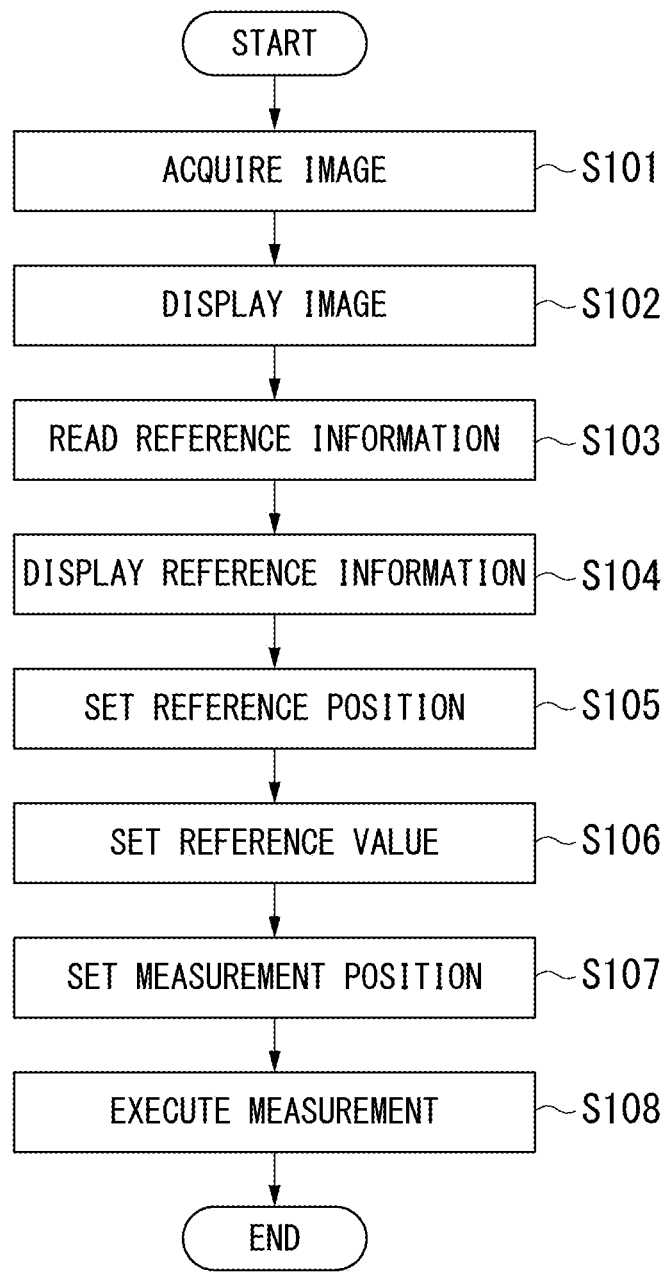
FIG. 4 is a flow chart showing a procedure of three-dimensional measurement in the first embodiment of the present invention.

Three-dimensional measurement in the first embodiment will be described with reference to FIG. 4. FIG. 4 shows a procedure of the three-dimensional measurement.

The imaging device 28 acquires an image of a subject by imaging the subject and generating an imaging signal (step S101). The CPU 18*a* acquires the image of the subject from the CCU 9 through the video signal processing circuit 12.

A video signal output from the CCU 9 is processed by the video signal processing circuit 12 and is output to the display unit 5. The display control unit 181 displays the image of the subject based on the video signal on the display unit 5 by controlling the video signal processing circuit 12 (step S102).

After step S102, the reading unit 186 reads one or more pieces of reference information from the RAM 14 (step S103). The display control unit 181 displays the one or more pieces of reference information on the display unit 5. At this time, the reference information is displayed on the image displayed in step S102 (step S104). The reading unit 186 may read a plurality of pieces of reference information from the RAM 14 and the display control unit 181 may display the plurality of pieces of reference information on the display unit 5.

After step S104, the reference position setting unit 182 determines a position designated as a reference position on the image by a user on the basis of the operation result of the operation unit 4, and sets the reference position at the designated position. The reference position setting unit 182 sets two reference positions on the image (step S105). After step S105, the reference value setting unit 184 sets a reference value designated by a user to the endoscope device 1 by associating the reference value with the image on the basis of the operation result of the operation unit 4, and stores the reference value in the RAM 14 (step S106).

After step S106, the measurement position setting unit 183 determines a position designated as a measurement position on the image by a user on the basis of the operation result of the operation unit 4, and sets the measurement position at the designated position. The measurement position setting unit 183 sets two or more measurement positions on the image (step S107). After step S107, the measurement unit 185 measures a size of the subject on the basis of the two or more measurement positions, the two reference positions, and the reference value by using images of the subject (step S108). When the process of step S108 is executed, the three-dimensional measurement ends.

The process of step S106 may be executed between the process of step S104 and the process of step S105. The process of step S106 may be executed between the process of step S107 and the process of step S108.

A method of operating an endoscope device according to each aspect of the present invention includes an image acquisition step, a first display step, a reading step, a second display step, a setting step, and a measurement step. The imaging device 28 acquires a first image of a subject in the image acquisition step (step S101). The display control unit 181 displays the first image or a second image regarding the first image on the display unit 5 in the first display step (step S102). The reading unit 186 reads one or more pieces of reference information from the RAM 14 in the reading step (step S103). The display control unit 181 displays the one or more pieces of reference information on the display unit 5 in the second display step (step S104). After the first image or the second image is displayed on the display unit 5 and the reference information is displayed on the display unit 5, the reference position setting unit 182 sets two reference positions on the first image or the second image in the setting step (step S105). The measurement unit 185 measures a size of the subject on the basis of the two reference positions set on the first image or the second image, two or more measurement positions set on the image on which the two reference positions are set, and the reference value in the measurement step (step S108). A method of operating an endoscope device according to each aspect of the present invention does not need to include steps other than the steps described above.

Figure 5:
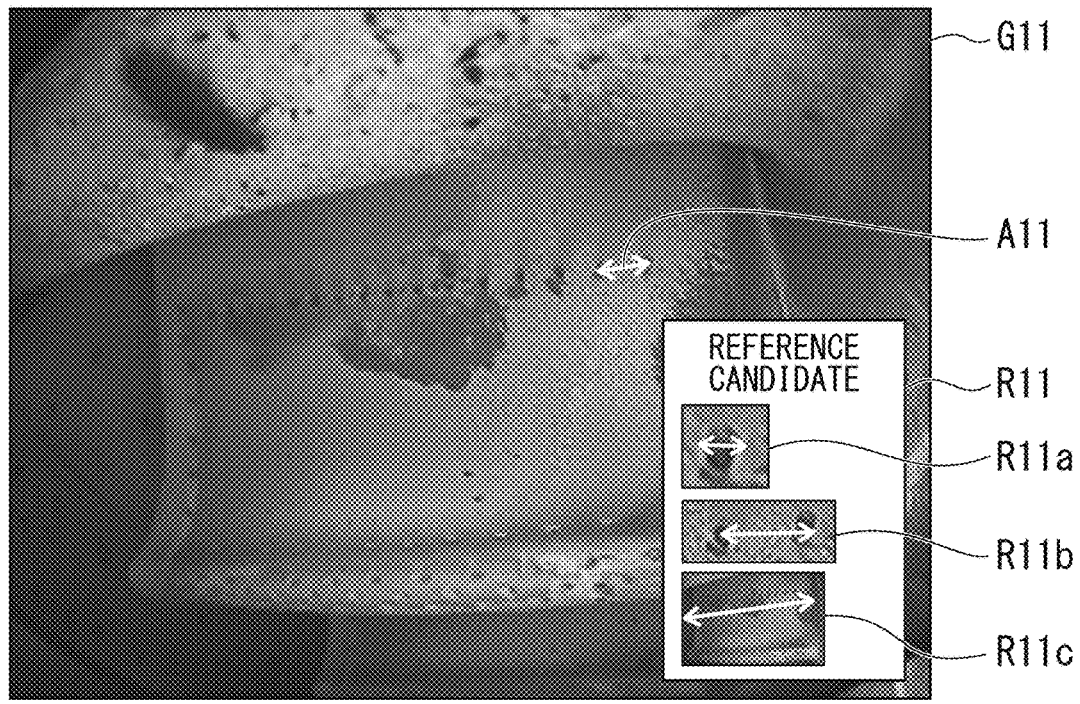
FIG. 5 is a diagram showing an example of an image displayed on a display unit according to the first embodiment of the present invention.

FIG. 5 shows an example of an image displayed on the display unit 5. In step S102, an image G11 is displayed. In step S104, a reference candidate R11 is displayed on the image G11. The reference candidate R11 represents a candidate of a reference object including two reference positions. The reference candidate R11 includes reference information R11a, reference information R11b, and reference information R11c. Each of pieces of reference information is an image of a reference object. In the reference information, two reference positions are suggested by an arrow. The reference information may be an image generated by magnifying or reducing an image of a reference object.

A user refers to the reference candidate R11 and searches the image G11 for a portion in which two reference positions are to be set. In step S105, two reference positions on the image G11 are designated by a user and the reference positions are set on the image G11. For example, a user designates the same reference positions as two reference positions represented by the reference information R11b on the image G11. An arrow A11 represents two reference positions set on the image G11.

In FIG. 5, three pieces of reference information are displayed. Only one piece of reference information may be displayed. Reference information may be displayed at a position that does not overlap the image G11.

Figure 6:
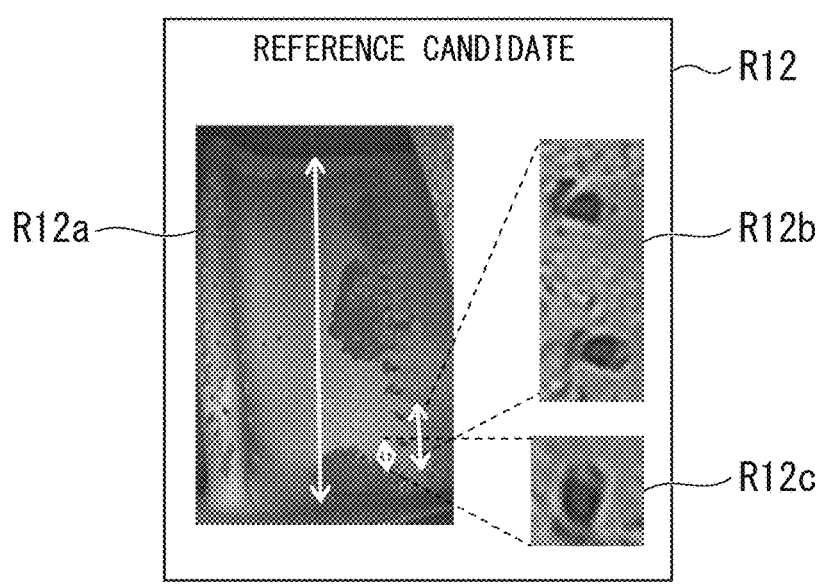
FIG. 6 is a diagram showing an example of reference information displayed on the display unit according to the first embodiment of the present invention.

FIG. 6 shows another example of reference information displayed on the display unit 5. A reference candidate R12 shown in FIG. 6 includes reference information R12a, reference information R12b, and reference information R12c. Reference information R12a represents reference positions throughout an inspection portion. In general, a plurality of inspection portions are present in one inspection object and a plurality of reference objects are present in one inspection portion. The reference information R12b and the reference information R12c represent a reference position in a local region of an inspection portion. The reference information R12b and the reference information R12c are associated with a position in an inspection portion represented by the reference information R12a.

In a case where a plurality of patterns that are similar to each other are included in an image, a user may have difficulty in finding a reference position. In the reference candidate R12 shown in FIG. 6, the relationship between two reference positions represented by each piece of the reference information R12b and the reference information R12c and a position in an inspection portion represented by the reference information R12a is shown. For this reason, a user can easily search for two reference positions.

In an example described above, reference information is a two-dimensional image of a subject. The form of reference information may be other than this. For example, reference information may be a three-dimensional image of a subject, a simple icon, an illustration, or the like. Reference information may include text information such as a name of an inspection portion in addition to an image of a reference object. It is easy for a user to find a reference position by referring to a text. Reference information may be text information that represents both a reference object and a reference position.

In the first embodiment, reference information that represents two reference positions on a subject is displayed on the display unit 5. For this reason, the endoscope device 1 can notify a user of two reference positions. A user can easily search for two reference positions on an image on the basis of the displayed reference information.

It can be avoided that a reference position is set to a position that should not be adopted as a reference position. For example, it can be avoided that a reference position is set to a structure having a dimension with a large error compared to a designed dimension. Alternatively, it can be avoided that a reference position is set to a structure having a large variation of a dimension compared to another structure.

Second Embodiment

An endoscope device 1 according to a second embodiment of the present invention includes the CPU 18a shown in FIG. 3. In the inspection of aircraft engines, the number of parts and the number of inspection portions are huge, and thus a large number of reference positions and a large number of reference values are present. For this reason, it is not realistic for a user to remember each reference value. A user refers to a manual and performs inspection. It is troublesome for a user to find a reference value in a manual having hundreds of pages. The endoscope device 1 according to the second embodiment has a function to eliminate a user's time and effort to look up a reference value.

In the second embodiment, a reference value is associated with reference information. The display control unit 181 displays reference information and a reference value on the display unit 5.

For example, reference information and a reference value are stored in the RAM 14. Reference information and a reference value are associated with each other. For example, reference information is an image of a reference object and the image of the reference object includes two reference positions. Reference information may include an image of a reference object and a reference value.

Figure 7:
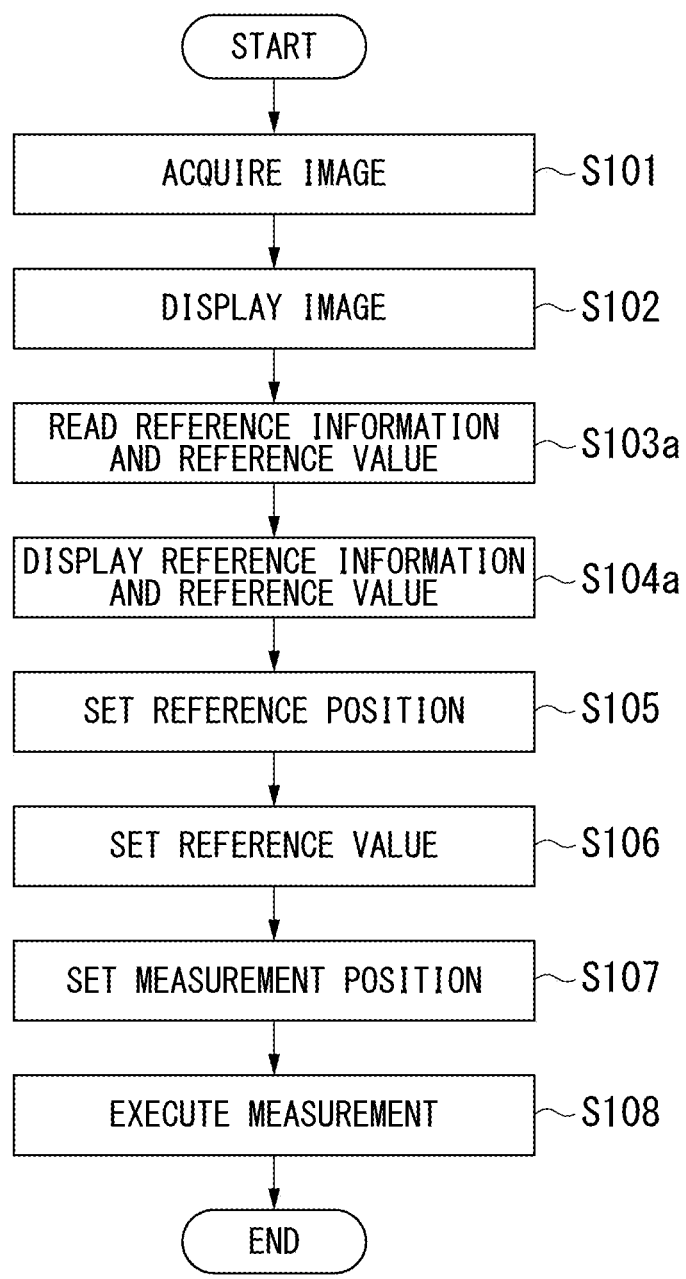
FIG. 7 is a flow chart showing a procedure of three-dimensional measurement in a second embodiment of the present invention.

Three-dimensional measurement in the second embodiment will be described using FIG. 7. FIG. 7 shows a procedure of the three-dimensional measurement. The same process as the process shown in FIG. 4 will not be described.

After step S102, the reading unit 186 reads one or more pieces of reference information and one or more reference values from the RAM 14 (step S103a). The display control unit 181 displays the one or more pieces of reference information and the one or more reference values on the display unit 5. At this time, the reference information and the reference values are displayed on the image that is displayed in step S102 (step S104a). The reading unit 186 may read a plurality of pieces of reference information and a plurality of reference values from the RAM 14. The display control unit 181 may display the plurality of pieces of reference information and the plurality of reference values on the display unit 5. After step S104*a*, the process of step S105 is executed.

The process of step S106 may be executed between the process of step S104*a* and the process of step S105. The process of step S106 may be executed between the process of step S107 and the process of step S108.

Figure 8:
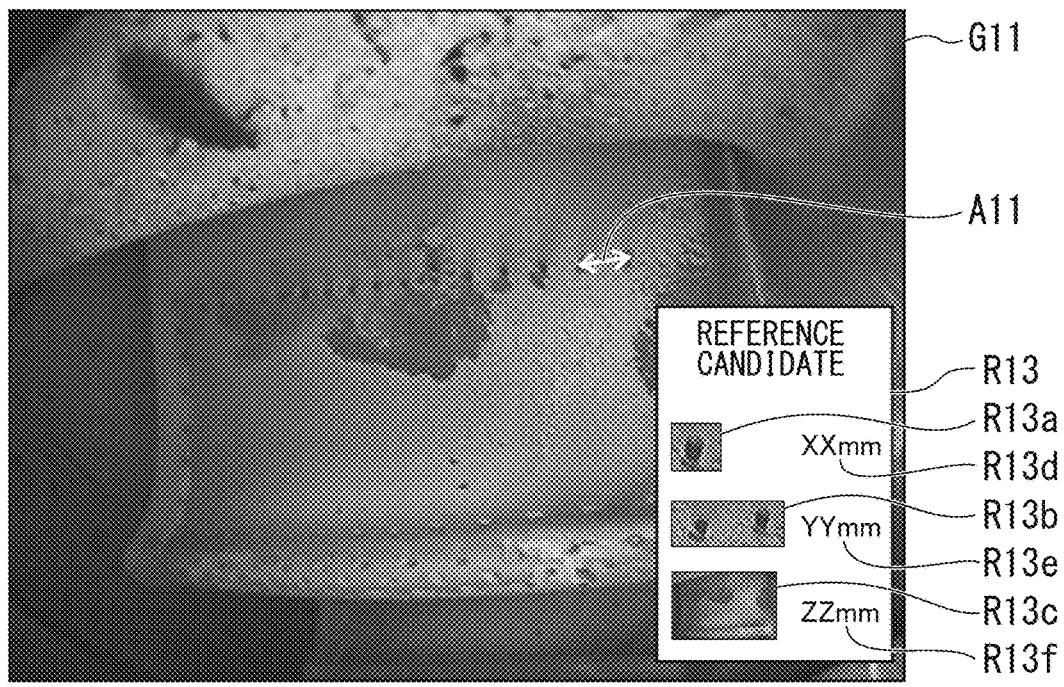
FIG. 8 is a diagram showing an example of an image displayed on a display unit according to the second embodiment of the present invention.

FIG. 8 shows an example of an image displayed on the display unit 5. In step S102, an image G11 is displayed. In step S104*a*, a reference candidate R13 is displayed on the image G11. The reference candidate R13 represents a candidate of a reference object including two reference positions. The reference candidate R13 includes reference information R13*a*, reference information R13*b*, reference information R13*c*, a reference value R13*d*, a reference value R13*e*, and a reference value R13*f*. Each of pieces of reference information is an image of a reference object. In the reference information, two reference positions may be suggested by a mark such as an arrow. The reference information may be an image generated by magnifying or reducing an image of a reference object.

Each of the reference values represents a length (three-dimensional distance) between two reference positions. The reference value R13*d* is associated with the reference information R13*a*. The reference value R13*e* is associated with the reference information R13*b*. The reference value R13*f* is associated with the reference information R13*c*.

A user refers to the reference candidate R13 and searches the image G11 for a portion in which two reference positions are to be set. In step S105, two reference positions on the image G11 are designated by a user and the reference positions are set on the image G11. For example, a user designates the same reference positions as two reference positions represented by the reference information R13*b* on the image G11. An arrow A11 represents two reference positions set on the image G11.

In step S106, a reference value is designated by a user. For example, a user designates the reference value R13*e* associated with the reference information R13*b*. A user inputs the reference value R13*e* to the operation unit 4 by operating the operation unit 4. The reference value R13*e* gets associated with the image G11.

Figure 9:
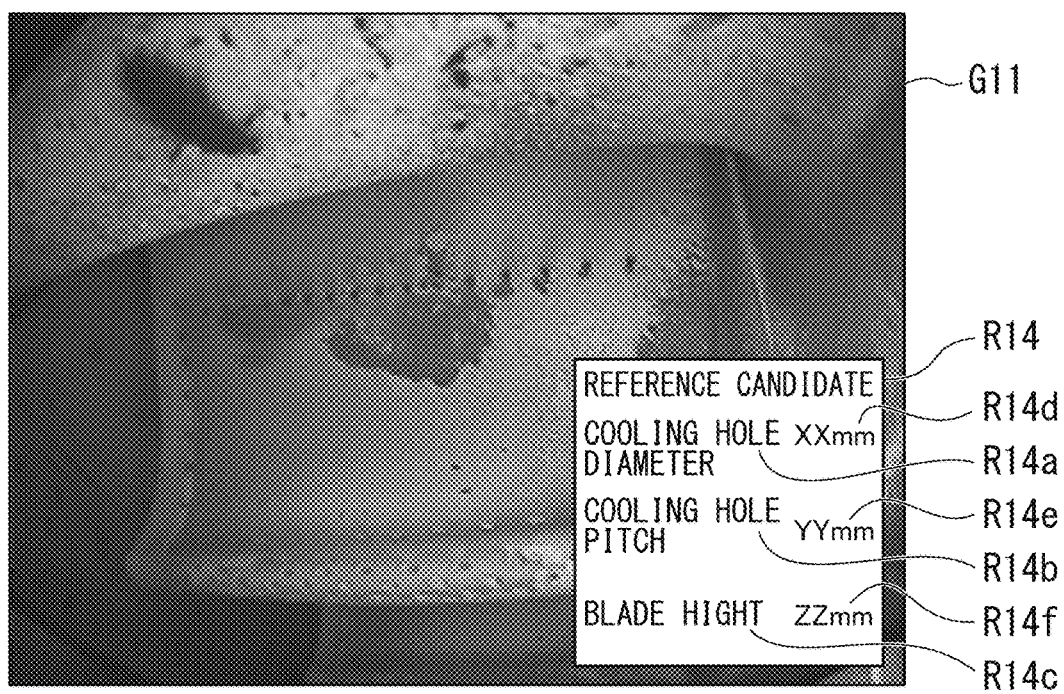
FIG. 9 is a diagram showing an example of an image displayed on the display unit according to the second embodiment of the present invention.

FIG. 9 shows another example of an image displayed on the display unit 5. A reference candidate R14 shown in FIG. 9 includes reference information R14*a*, reference information R14*b*, reference information R14*c*, a reference value R14*d*, a reference value R14*e*, and a reference value R14*f*. Each of pieces of reference information is text information of both a reference object and a reference position. The reference information R14*a* represents that a reference object is a cooling hole and a reference position is a point that defines the diameter of the cooling hole. The reference information R14*b* represents that a reference object is a cooling hole and a reference position is a point that defines the pitch between cooling holes. The reference information R14*c* represents that a reference object is a blade and a reference position is a point that defines the height of the blade. Each of the reference values represents a length (three-dimensional distance) between two reference positions.

In the second embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

Reference information and a reference value may be information of a part other than a fixed part. For example, after a user performs inspection, an image of any inspected part may be registered as reference information. A dimension of any inspected part may be registered as a reference value. A user can use information of a part that has been inspected in the next inspection. In a case where a user repetitively performs inspection of a part that is not previously recorded in a manual, a user can easily use a reference value for the sake of the user.

A user may modify reference information or a reference value that are previously registered. In a case where a user updates an image of a subject like a burnt portion and the like, identifying a reference position becomes easy. Even when a designed dimension value and an actual dimension value are different due to the change over time and the like, identifying a reference position becomes easy.

Third Embodiment

It is troublesome for a user to find a reference value in a manual having hundreds of pages. In addition, it is troublesome for a user to input a reference value. The endoscope device 1 according to a third embodiment has a function to eliminate a user's time and effort to look up a reference value. Further, the endoscope device 1 according to the third embodiment has a function to eliminate a user's time and effort to input a reference value.

Figure 10:
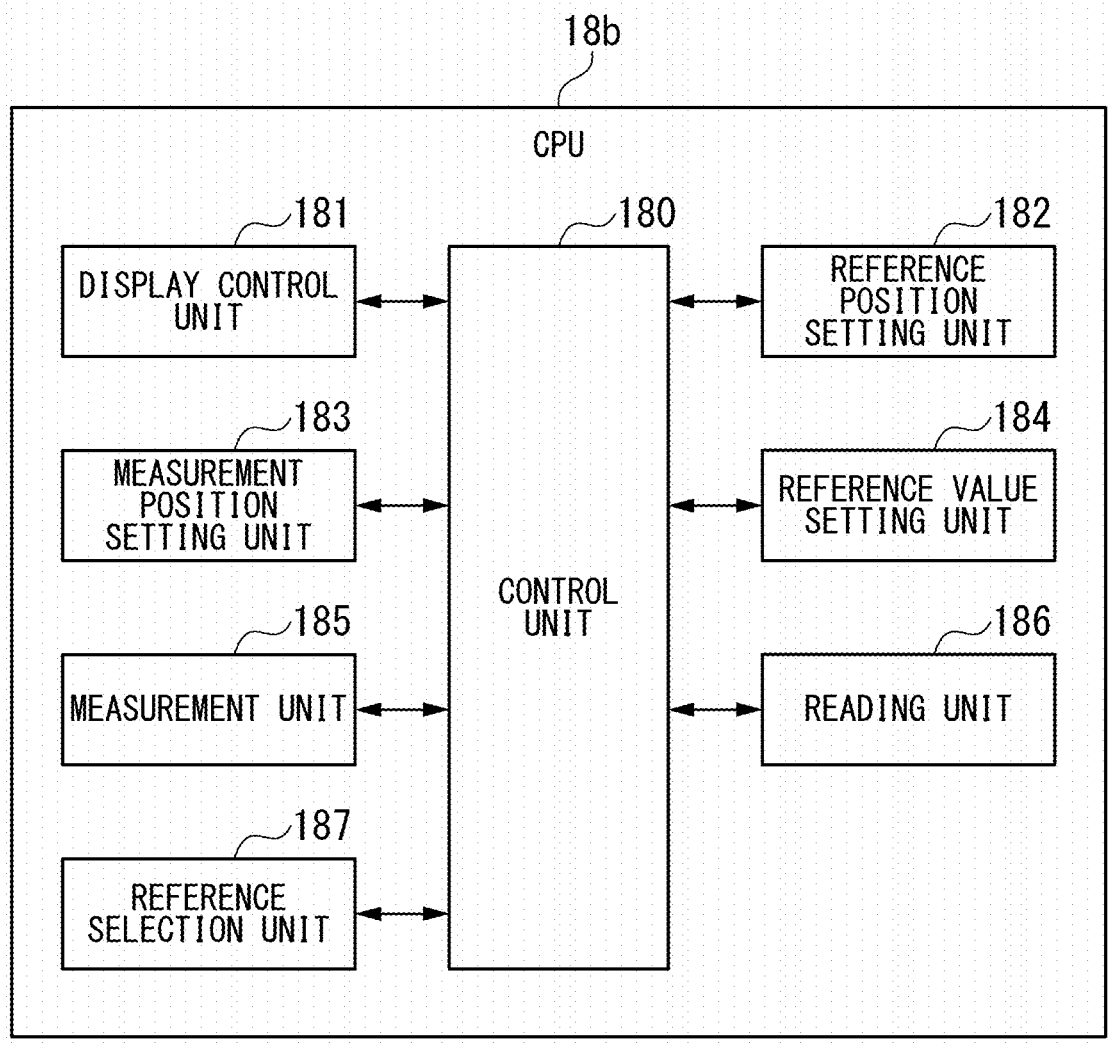
FIG. 10 is a block diagram showing a functional configuration of a CPU according to a third embodiment of the present invention.

In the third embodiment of the present invention, the CPU 18*a* shown in FIG. 3 is changed to a CPU 18*b* shown in FIG. 10. FIG. 10 shows a functional configuration of the CPU 18*b*. The same configuration as the configuration shown in FIG. 3 will not be described.

The CPU 18*b* includes a reference selection unit 187 in addition to the components shown in FIG. 3. A reference value is associated with reference information. After reference information is displayed on the display unit 5, the reference selection unit 187 selects one piece of reference information selected by a user from the reference information displayed on the display unit 5. The measurement unit 185 executes measurement using a reference value associated with the reference information selected by the reference selection unit 187.

Figure 11:
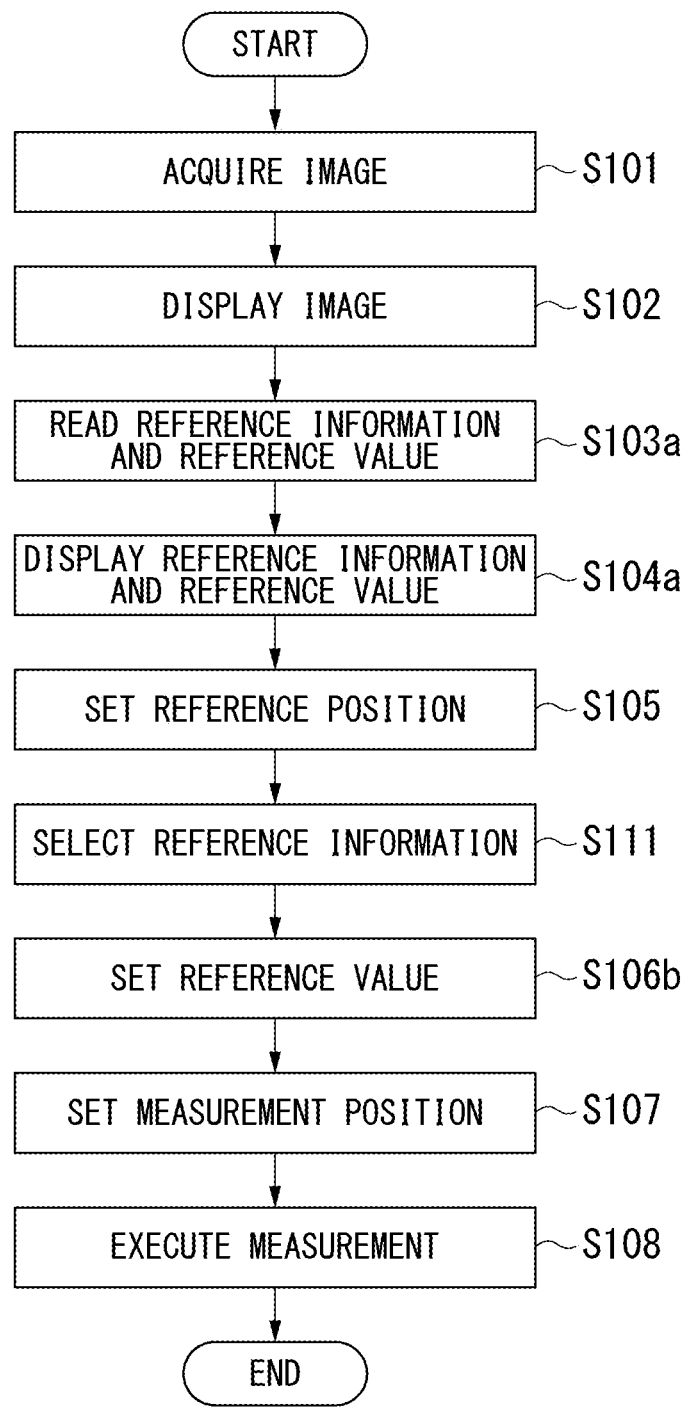
FIG. 11 is a flow chart showing a procedure of three-dimensional measurement in the third embodiment of the present invention.

Three-dimensional measurement in the third embodiment will be described using FIG. 11. FIG. 11 shows a procedure of the three-dimensional measurement. The same process as the process shown in FIG. 7 will not be described.

After step S105, the reference selection unit 187 determines reference information designated by a user on the basis of the operation result of the operation unit 4. The reference selection unit 187 selects reference information selected by a user from one or more pieces of reference information displayed on the display unit 5 (step S111). Step S111 corresponds to a selection step.

A user inputs information that designates one piece of reference information by operating the operation unit 4. For example, a user touches a reference object that the user desires to designate from one or more reference objects displayed on the display unit 5. The operation unit 4 accepts information that is input to the operation unit 4 by a user and outputs the information. The information input to the operation unit 4 is input to the control interface 17. The information input to the control interface 17 is input to the CPU 18*b*. The reference selection unit 187 selects reference information represented by the information input to the CPU 18*b*.

After step S111, the reference value setting unit 184 sets a reference value associated with the reference information selected by the reference selection unit 187 to the endoscope device 1 by associating the reference value with the image, and stores the reference value in the RAM 14 (step S106*b*). After step S106*b*, the process of step S107 is executed.

In step S106*b*, a reference value associate with the reference information designated by a user is automatically set. The measurement unit 185 executes three-dimensional measurement on the basis of the reference value in step S108.

The process of step S111 may be executed between the process of step S104*a* and the process of step S105. Although reference information and a reference value are associated with each other, the reference value may not be displayed. In other words, a reference value may not be displayed in step S104*a*. A reference value may not be read in step S103*a*. The process of step S106*b* may be executed between the process of step S107 and the process of step S108.

Figure 12:
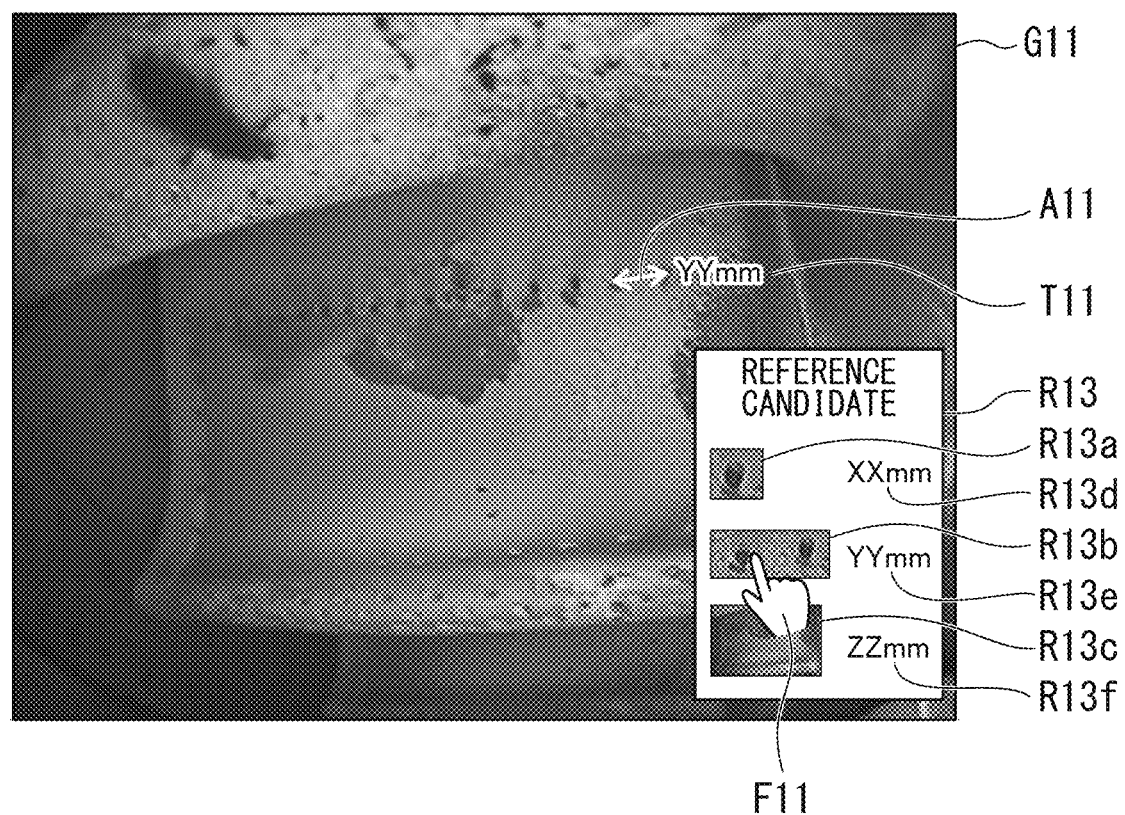
FIG. 12 is a diagram showing an example of an image displayed on a display unit according to the third embodiment of the present invention.

FIG. 12 shows an example of an image displayed on the display unit 5. In step S102, an image G11 is displayed. In step S104*a*, a reference candidate R13 is displayed on the image G11. The reference candidate R13 is the same as the reference candidate R13 shown in FIG. 8.

In step S111, a user designates one of three pieces of reference information included in the reference candidate R13. For example, a user touches the reference information R13*b* with a finger F11. The reference selection unit 187 selects the reference information R13*b*. A text T11 for notifying a user of the reference value R13*e* associated with the reference information R13*b* is displayed near a reference position.

In the third embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

A reference value associated with reference information designated by a user is used for measurement. For this reason, a user's time and effort to look up and input the reference value are eliminated.

Fourth Embodiment

An endoscope device 1 according to a fourth embodiment of the present invention includes the CPU 18*a* shown in FIG. 3.

The RAM 14 stores one or more pieces of reference information for each of a plurality of subjects. The reading unit 186 reads one or more pieces of reference information for one subject included in the plurality of subjects from the RAM 14 on the basis of information of the one subject. For example, the reading unit 186 reads one or more pieces of reference information for one subject designated by a user from a plurality of subjects (inspection portions) from the RAM 14.

Figure 13:
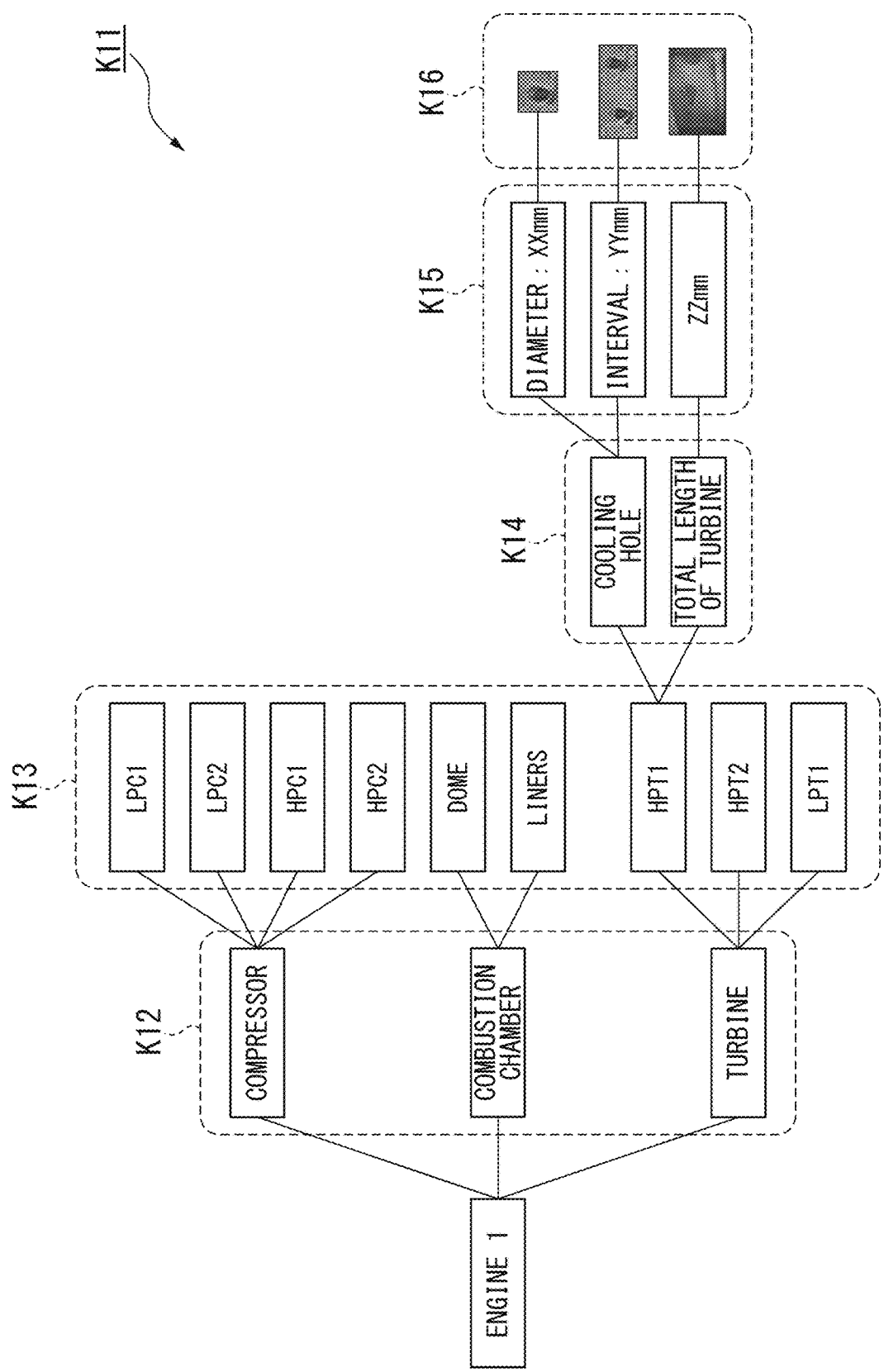
FIG. 13 is a diagram showing an example of inspection information stored in a storage unit according to a fourth embodiment of the present invention.

FIG. 13 shows inspection information K11 stored in RAM 14. The inspection information K11 includes information used for measurement for inspection of an aircraft engine. The inspection information K11 includes an inspection object K12, an inspection portion K13, a reference object K14, a reference value K15, and reference information K16. The pieces of information described above are associated with each other.

Three inspection objects K12 in an aircraft engine are included in the inspection information K11. A plurality of inspection portions K13 are associated with each of the inspection objects K12. A plurality of reference objects K14 are associated with each of the inspection portions K13. Only the reference object K14 associated with HPT1 that is the inspection portion K13 is shown in FIG. 13. The reference object K14 associated with the inspection portion K13 other than HPT1 is omitted. Two reference objects K14 are associated with HPT1. One or two reference values K15 are associated with each of the reference objects K14. The reference information K16 is associated with each of the reference values K15. The reference information K16 is an image of the reference object K14.

Figure 14:
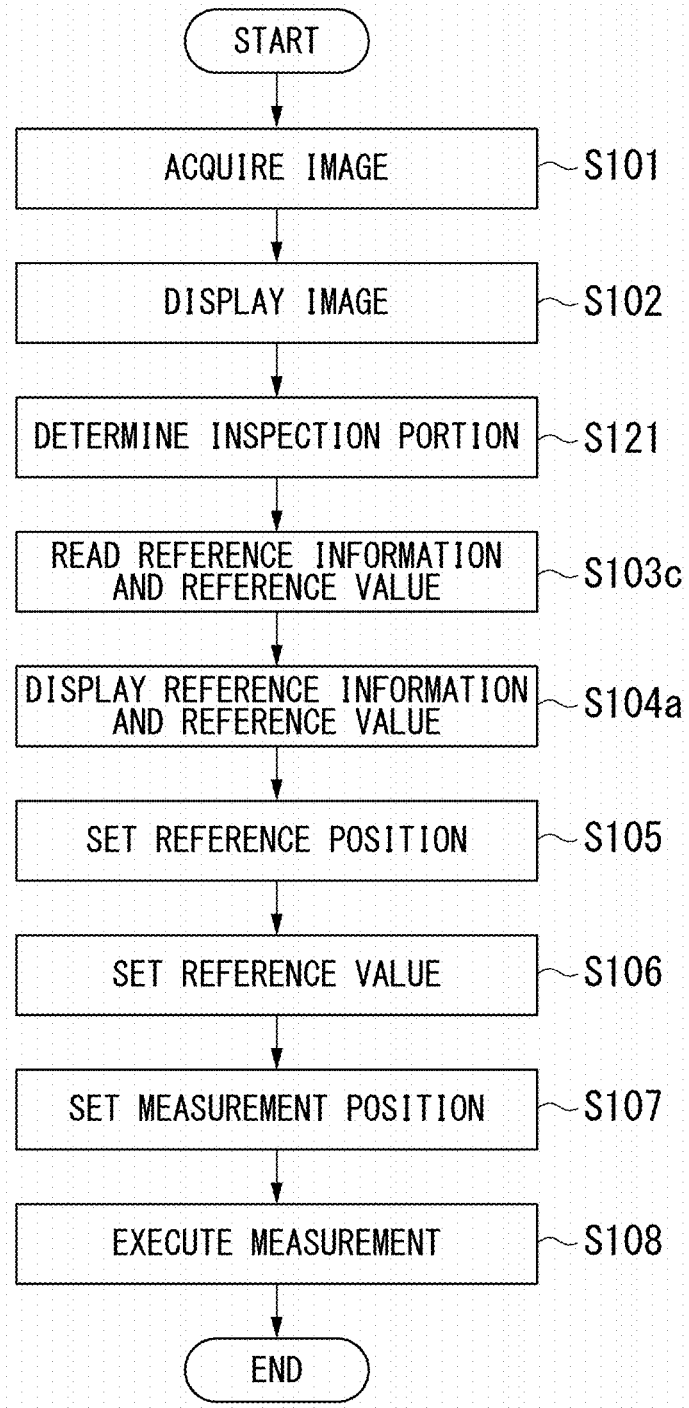
FIG. 14 is a flow chart showing a procedure of three-dimensional measurement in the fourth embodiment of the present invention.

Three-dimensional measurement in the fourth embodiment will be described using FIG. 14. FIG. 14 shows a procedure of the three-dimensional measurement. The same process as the process shown in FIG. 7 will not be described.

After step S102, the reading unit 186 determines an inspection portion designated by a user on the operation result of the operation unit 4 (step S121).

A user inputs information that designates one inspection portion to the operation unit 4 by operating the operation unit 4. For example, a plurality of inspection portions regarding a plurality of reference information are displayed on the display unit 5. A user touches an inspection portion that the user desires to designate from the plurality of inspection portions displayed on the display unit 5. The operation unit 4 accepts information that is input to the operation unit 4 by a user and outputs the information. The information input to the operation unit 4 is input to the control interface 17. The information input to the control interface 17 is input to the CPU 18*a*. The reading unit 186 determines that an inspection portion represented by the information input to the CPU 18*a* is designated in step S121.

After step S121, the reading unit 186 reads one or more pieces of reference information of the inspection portion designated by a user and one or more reference values of the inspection portion designated by the user from the RAM 14 (step S103*c*). After step S103*c*, the process of step S104*a* is executed.

In step S121, the display control unit 181 may display information of the inspection portion designated by a user on the display unit 5. Before the process of step S101 or the process of step S102 is executed, the process of step S121 may be executed.

A reference value may not be read in step S103*c*. A reference value may not be displayed in step S104*a*. Instead of the process of step S106, the process of step S106*b* shown in FIG. 11 may be executed.

The process of step S106 may be executed between the process of step S104*a* and the process of step S105. The process of step S106 may be executed between the process of step S107 and the process of step S108.

Figure 15:
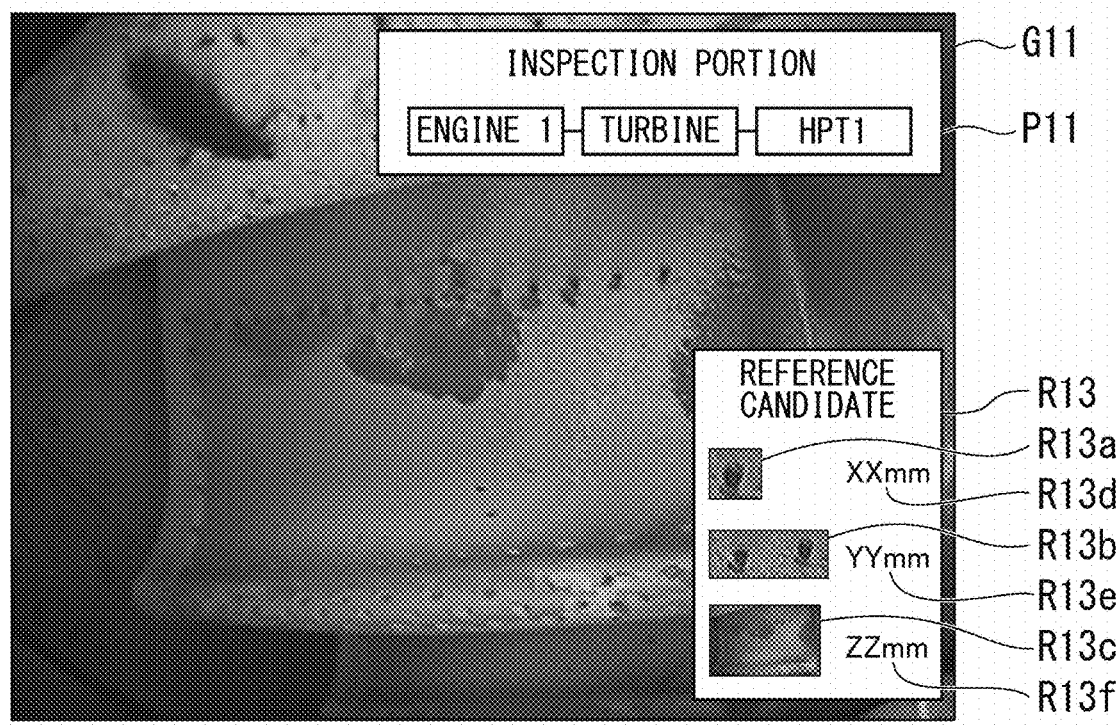
FIG. 15 is a diagram showing an example of an image displayed on a display unit according to the fourth embodiment of the present invention.

FIG. 15 shows an example of an image displayed on the display unit 5. In step S102, an image G11 is displayed. In step S121, information P11 of an inspection portion designated by a user is displayed on the image G11. For example, a user designates HPT1 as an inspection portion. In the inspection information shown in FIG. 13, the reference value K15 and the reference information K16 are associated with the reference object K14 of HPT1. In step S103*c*, the reference value K15 and the reference information K16 are read from the RAM 14. In step S104*a*, a reference candidate R13 is displayed on the image G11. The reference candidate R13 is the same as the reference candidate R13 shown in FIG. 8. The reference candidate R13 includes the reference value K15 and the reference information K16 associated with the reference object K14 of HPT1.

In the fourth embodiment, reference information of an inspection portion selected by a user is displayed on the display unit 5. For this reason, the endoscope device 1 can notify a use of two reference positions. Even when too many types of reference information are registered or a plurality of types of reference information that are similar to each other are registered, only necessary reference information is displayed. For this reason, a user can easily search for two reference positions on an image on the basis of the displayed reference information.

A reference value is displayed on the display unit 5. For this reason, the endoscope device 1 can notify a use of the reference value. Since the reference value is displayed, a user's time and effort to look up the reference value are eliminated.

The CPU 18a may determine an inspection portion on the basis of an image of a subject. For example, the CPU 18a compares part of the image of the subject with an image of an inspection portion prepared in advance. When the similarity between the part of the image of the subject and the image of the inspection portion is high, the reading unit 186 may read reference information of the inspection portion from the RAM 14.

The CPU 18a may detect a position of the tip end 20 of the insertion unit 2 on the basis of the control result of the bending mechanism. The CPU 18a may determine an inspection portion on the basis of the position. In a case where the endoscope device 1 automatically recognizes an inspection portion, it is possible to easily realize correct inspection.

Fifth Embodiment

Figure 16:
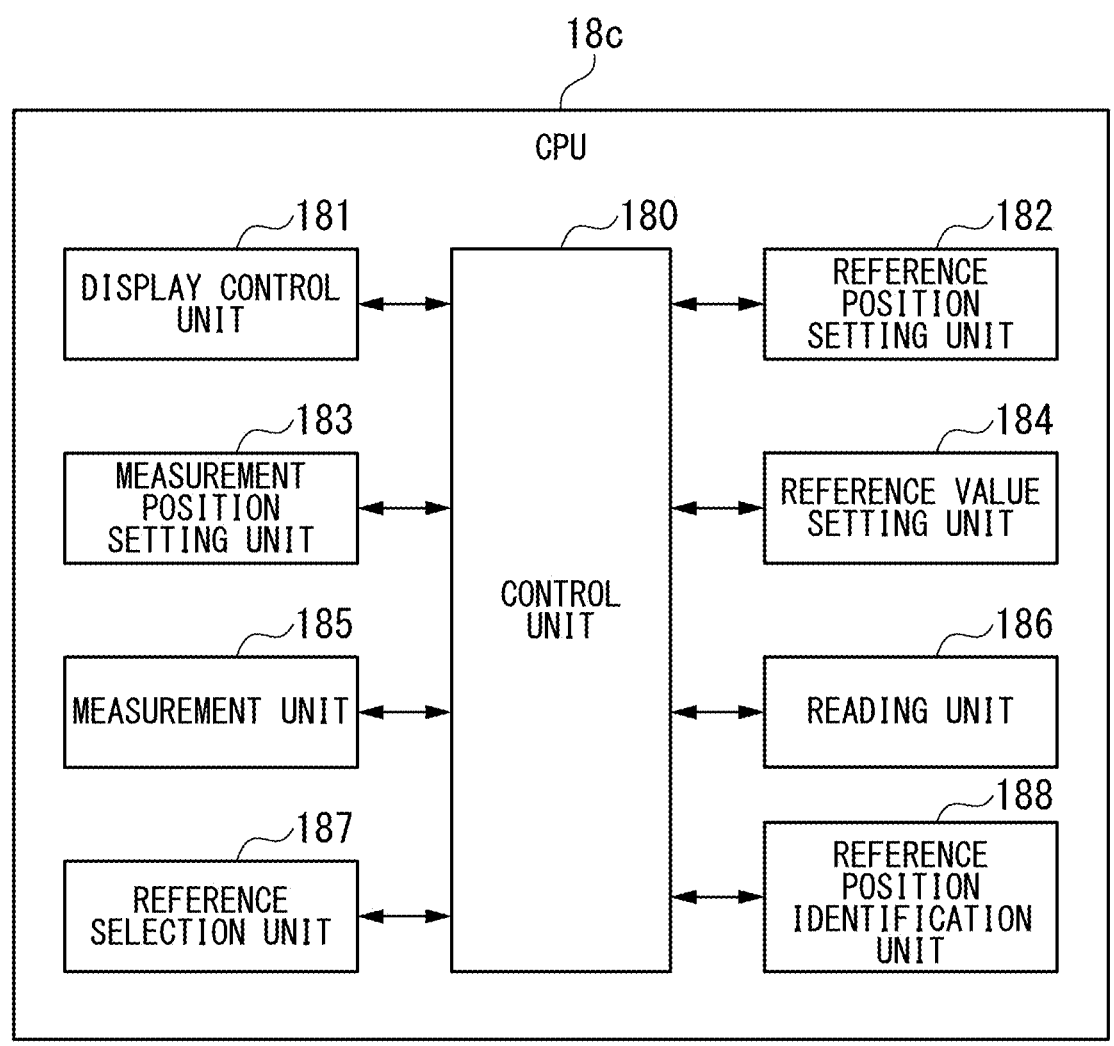
FIG. 16 is a block diagram showing a functional configuration of a CPU according to a fifth embodiment of the present invention.

In a fifth embodiment of the present invention, the CPU 18b shown in FIG. 10 is changed to a CPU 18c shown in FIG. 16. FIG. 16 shows a functional configuration of the CPU 18c. The same configuration as the configuration shown in FIG. 10 will not be described.

The CPU 18c includes a reference position identification unit 188 in addition to the components shown in FIG. 10. The reference position identification unit 188 identifies two reference positions on a first image of a subject or a second image regarding the first image. The display control unit 181 displays reference position information that represents the two reference positions identified by the reference position identification unit 188 on the display unit 5.

Reference information is an image of a reference object including two reference positions. For example, the reference position identification unit 188 identifies a similar region that is in the first image or the second image and is the most similar to the image of the reference object, and identifies two reference positions of the similar region on the basis of the two reference positions of the image of the reference object.

As a method of detecting a similar region, for example, template matching can be used. For example, the reference position identification unit 188 calculates the similarity between each of a plurality of regions in the first image or the second image and the image of the reference object. The reference position identification unit 188 takes magnification, reduction, rotation, and deformation according to angles of a visual line into consideration and calculates the similarity by performing affine transformation on a template. The reference position identification unit 188 detects a similar region having the highest similarity and identifies two reference positions in the similar region.

Reference information is associated with two reference positions. For example, the reference information and the two reference positions are stored in the RAM 14. The reference information and the two reference positions are associated with each other. For example, the reference information includes the image of the reference object and coordinate information of two reference positions in the image. The reference position identification unit 188 performs alignment between the detected similar region and the image of the reference object. After the alignment is performed, the reference position identification unit 188 identifies the two reference positions in the detected similar region on the basis of the coordinate information of the two reference positions in the image of the reference object.

A method of detecting a similar region is not limited to the template matching. The reference position identification unit 188 may detect a similar region using a feature amount acquired through Haar-like, histograms of oriented gradients (HOG), scale-invariant feature transform (SIFT), or the like. The reference position identification unit 188 may detect a similar region by performing machine learning using deep leaning and the like.

After the reference information is displayed on the display unit 5, the reference selection unit 187 selects one piece of reference information selected by a user from the reference information displayed on the display unit 5. The similar region identified by the reference position identification unit 188 is the most similar to the image of the reference object selected by the reference selection unit 187.

Figure 17:
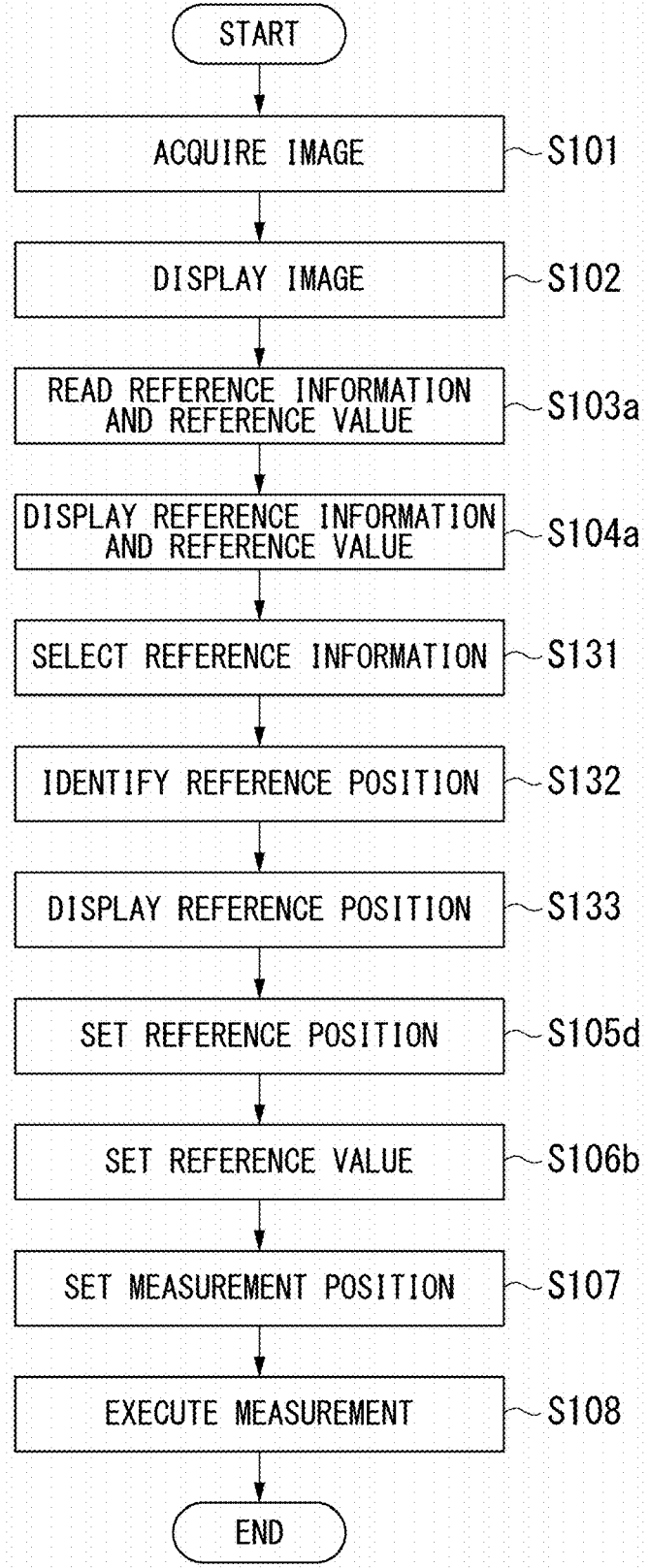
FIG. 17 is a flow chart showing a procedure of three-dimensional measurement in the fifth embodiment of the present invention.

Three-dimensional measurement in the fifth embodiment will be described using FIG. 17. FIG. 17 shows a procedure of the three-dimensional measurement. The same process as the process shown in FIG. 11 will not be described.

After step S104a, the reference selection unit 187 determines reference information designated by a user on the basis of the operation result of the operation unit 4. The reference selection unit 187 selects reference information selected by a user from one or more pieces of reference information displayed on the display unit 5 (step S131). The process of step S131 is similar to the process of step S111 in FIG. 11.

After step S131, the reference position identification unit 188 identifies a reference position in the image displayed on the display unit 5. For example, the reference position identification unit 188 calculates the similarity between each of a plurality of regions in the image displayed on the display unit 5 and an image of a reference object. The image of the reference object is included in the reference information selected by the reference selection unit 187. The reference position identification unit 188 detects a similar region having the highest similarity and identifies two reference positions in the similar region (step S132). Step S132 corresponds to an identification step.

After step S132, the display control unit 181 displays reference position information that represents the two reference positions identified by the reference position identification unit 188 on the display unit 5 (step S133). For example, the reference position information is a line, a frame, an arrow, a mark, a figure, or a text. For example, the display control unit 181 generates a graphic image signal of the reference position information. Thereafter, the process similar to the process for displaying the reference information is executed. The display unit 5 displays an image on which the reference position information is superimposed. For example, the display control unit 181 displays reference position information at a reference position on the image. Step S133 corresponds to a third display step.

After step S133, a user determines whether or not to designate the two reference positions represented by the reference position information. In other words, a user determines whether or not to designate the two reference positions identified by the reference position identification unit 188. A user inputs the determination result to the operation unit 4. For example, when a user determines to designate the two reference positions represented by the reference position information, the reference position setting unit 182 sets the reference positions on the image. In other words, the reference position setting unit 182 sets the two reference positions identified by the reference position identification unit 188 on the image. In a case where a user desires to designate other positions as reference positions, a user inputs new two reference positions by operating the operation unit 4. The reference position setting unit 182 determines the positions designated as reference positions on the image by a user on the basis of the operation result of the operation unit 4, and sets reference positions at the designated positions (step S105d). After step S105d, the process of step S106b is executed.

A reference value may not be read in step S103a. A reference value may not be displayed in step S104a. Instead of the process of step S106b, the process of step S106 shown in FIG. 4 may be executed. The process of step S106b may be executed between the process of step S131 and the process of step S105d. The process of step S106b may be executed between the process of step S107 and the process of step S108.

Figure 18:
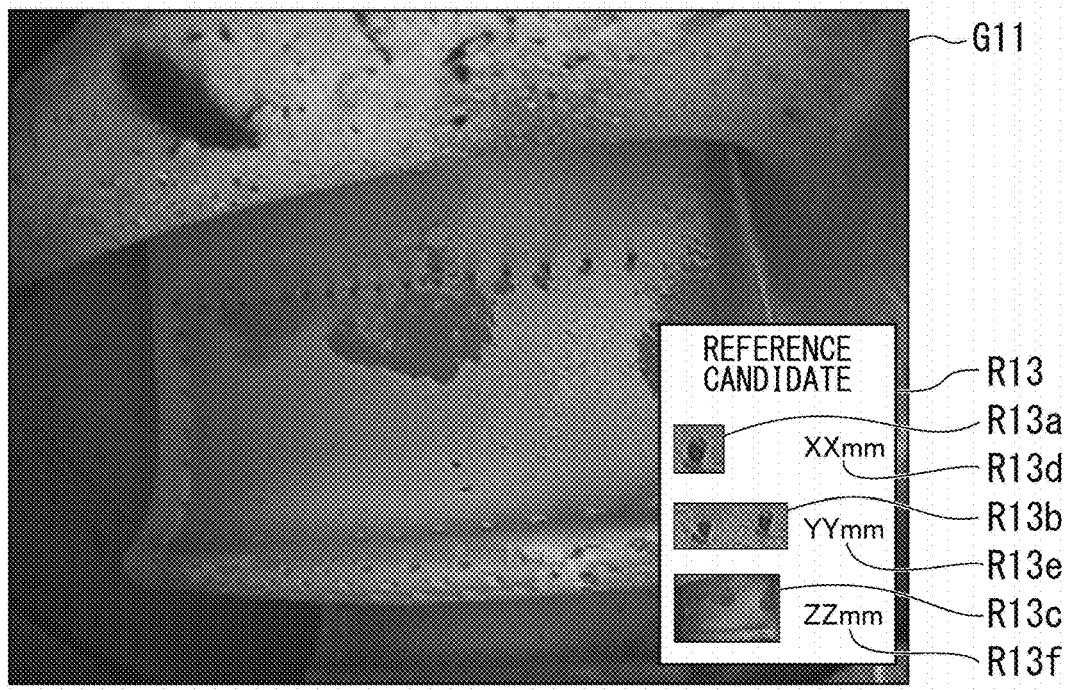
FIG. 18 is a diagram showing an example of an image displayed on a display unit according to the fifth embodiment of the present invention.

FIGS. 18 to 22 show examples of images displayed on the display unit 5. In step S102, an image G11 shown in FIG. 18 is displayed. In step S104a, a reference candidate R13 shown in FIG. 18 is displayed on the image G11. The reference candidate R13 is the same as the reference candidate R13 shown in FIG. 8.

Figure 19:
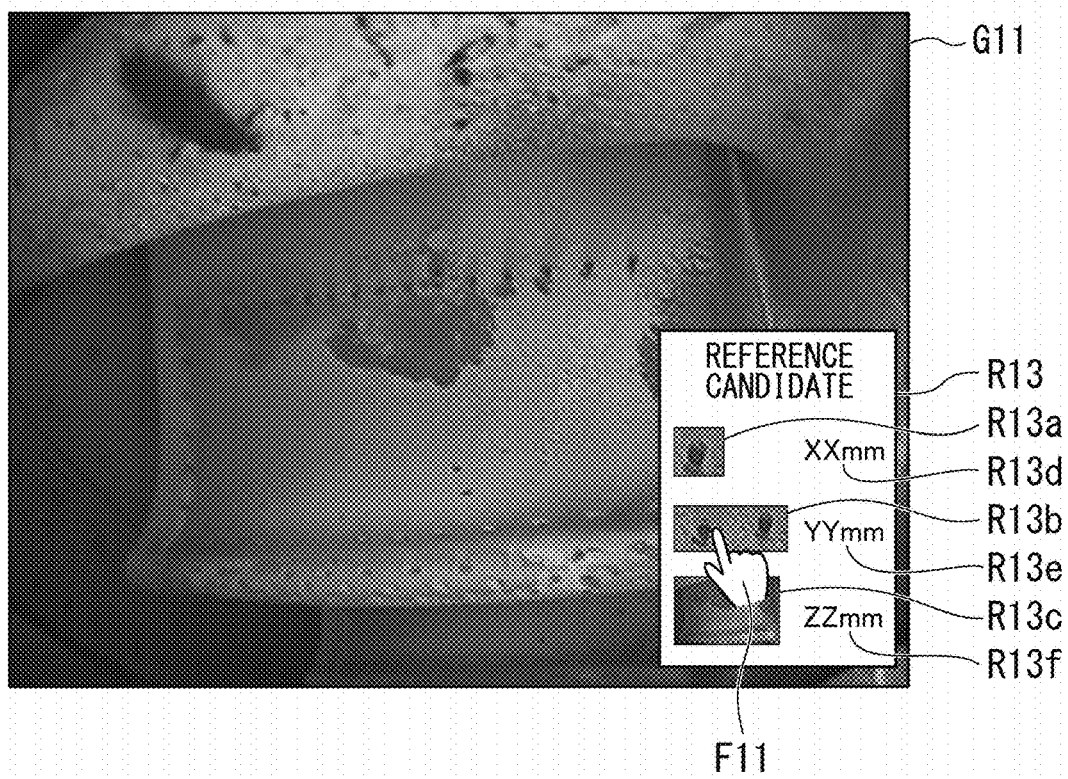
FIG. 19 is a diagram showing an example of an image displayed on the display unit according to the fifth embodiment of the present invention.

In step S131, a user designates one of three pieces of reference information included in the reference candidate R13. For example, a user touches the reference information R13b with a finger F11 (FIG. 19). The reference selection unit 187 selects the reference information R13b.

Figure 20:
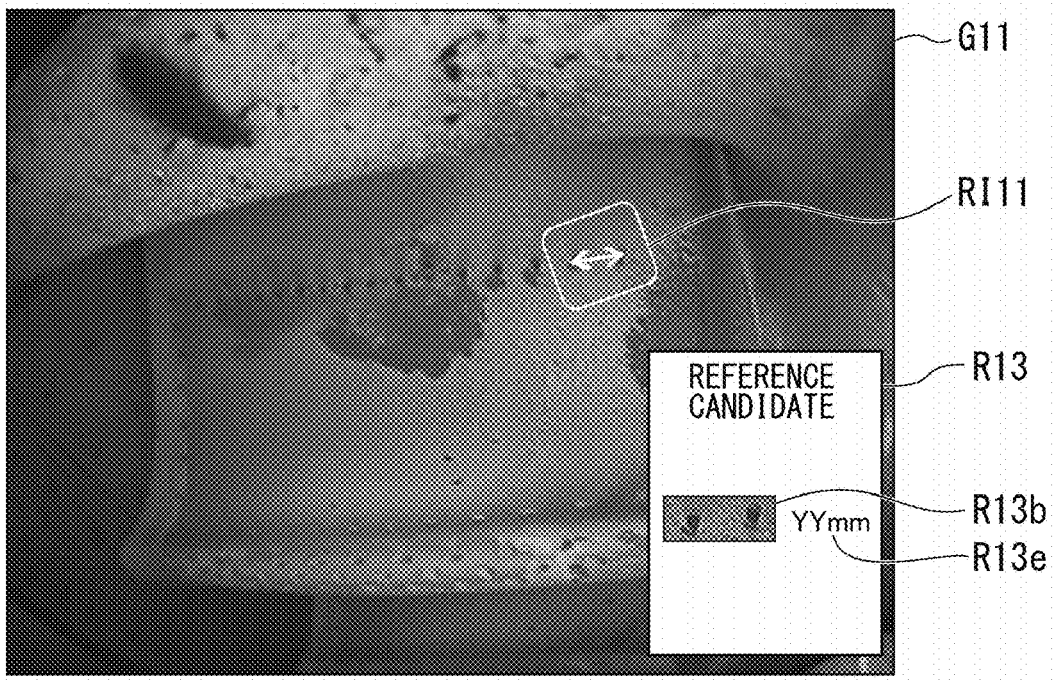
FIG. 20 is a diagram showing an example of an image displayed on the display unit according to the fifth embodiment of the present invention.

In step S132, the reference position identification unit 188 identifies a reference position on the image G11. In other words, the reference position identification unit 188 identifies a similar region having the highest similarity with the reference information R13b in the image G11. In step S133, reference position information RI11 shown in FIG. 20 is displayed on the image G11. The reference position information RI11 includes a frame that represents a reference object and an arrow that represents two reference positions. In the reference candidate R13, only the reference information R13b designated by a user and a reference value R13e associated with the reference information R13b are displayed.

Figure 21:
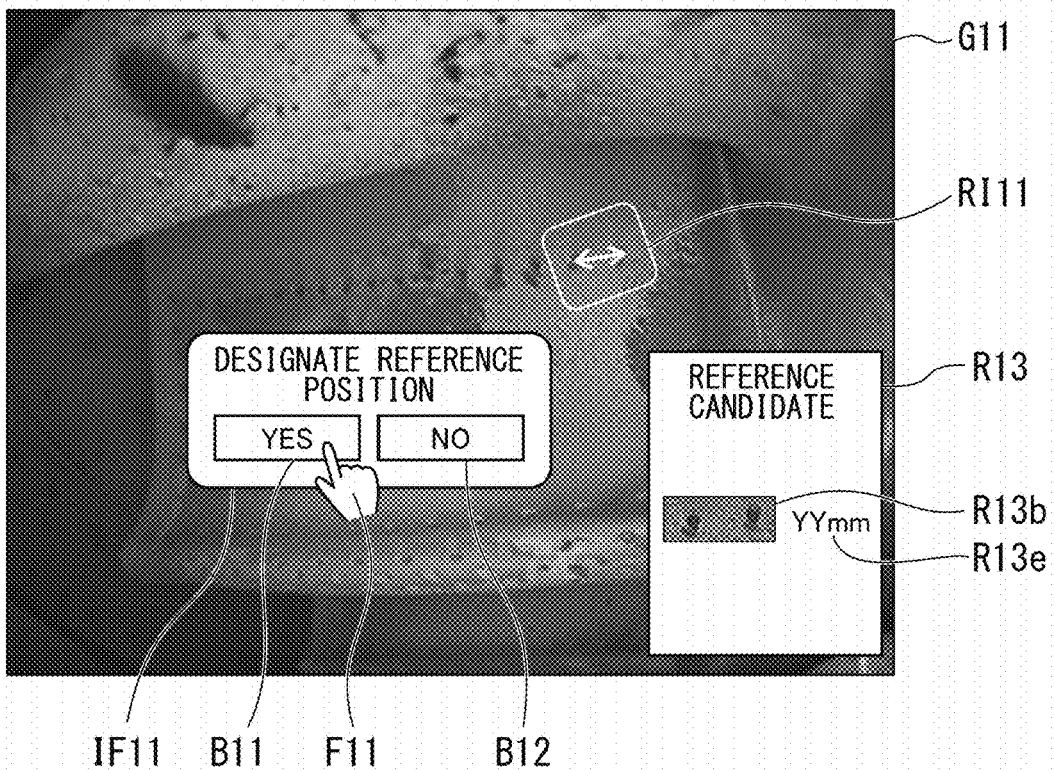
FIG. 21 is a diagram showing an example of an image displayed on the display unit according to the fifth embodiment of the present invention.

In step S105d, a user determines whether or not to designate the two reference positions represented by the reference position information RI11. For example, an operation interface IF11 for a user to input the determination result is displayed on the image G11 (FIG. 21). For example, the operation interface IF11 includes a button B11 and a button B12. A user touches the button B11 with a finger F11 in order to designate the two reference positions represented by the reference position information RI11. Alternatively, a user touches the button B12 with the finger F11 in order to designate reference positions other than the reference positions represented by the reference position information RI11. When a user operates the button B12, the user designates new two reference positions like step S105 shown in FIG. 4.

Figure 22:
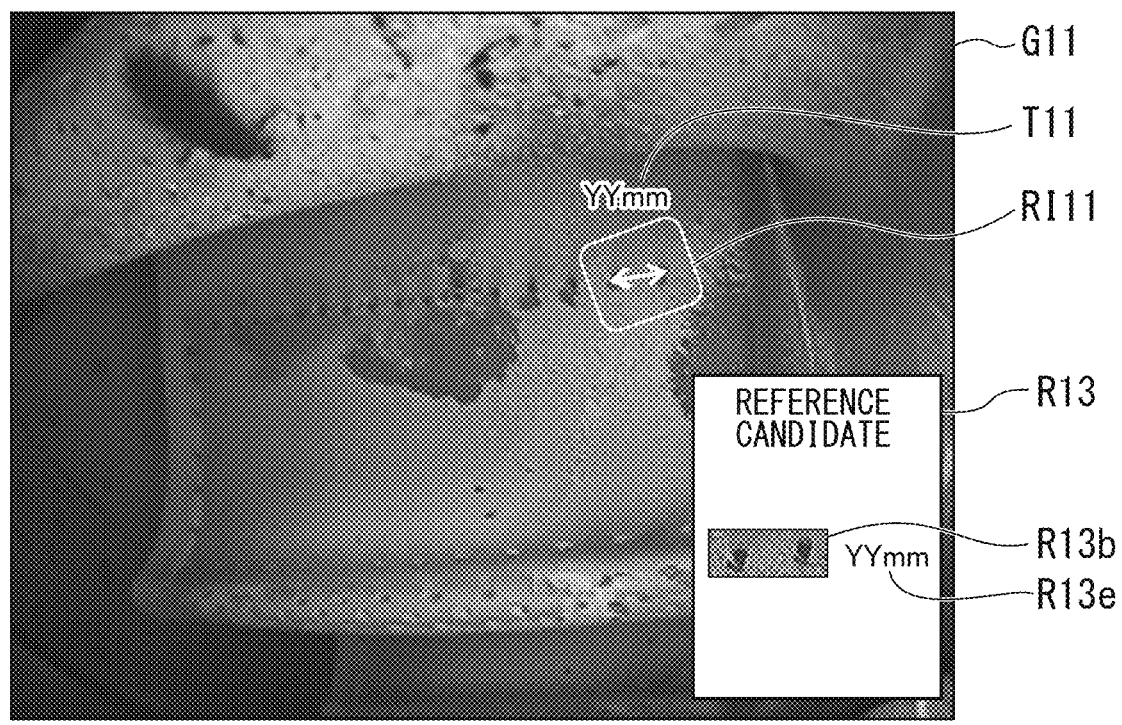
FIG. 22 is a diagram showing an example of an image displayed on the display unit according to the fifth embodiment of the present invention.

When a user operates the button B11, the two reference positions represented by the reference position information RI11 are set to the image G11. A text T11 for notifying a user of the reference value R13e associated with the reference information R13b is displayed near the reference position information RI11 (FIG. 22).

In the fifth embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

The reference position identification unit 188 identifies two reference positions in an image. For this reason, a user's time and effort to designate two reference positions are eliminated. Since two reference positions are identified through an image processing, the reference position setting unit 182 can accurately set the two reference positions. For example, the reference position setting unit 182 can set the two reference positions at a sub-pixel level. A user may modify the two reference positions identified by the reference position identification unit 188.

The display control unit 181 displays reference position information that represents the two reference positions identified by the reference position identification unit 188 on the display unit 5. For this reason, the endoscope device 1 can notify a user of two reference positions. A user can easily understand two reference positions on the basis of the displayed reference position information.

Sixth Embodiment

Figure 23:
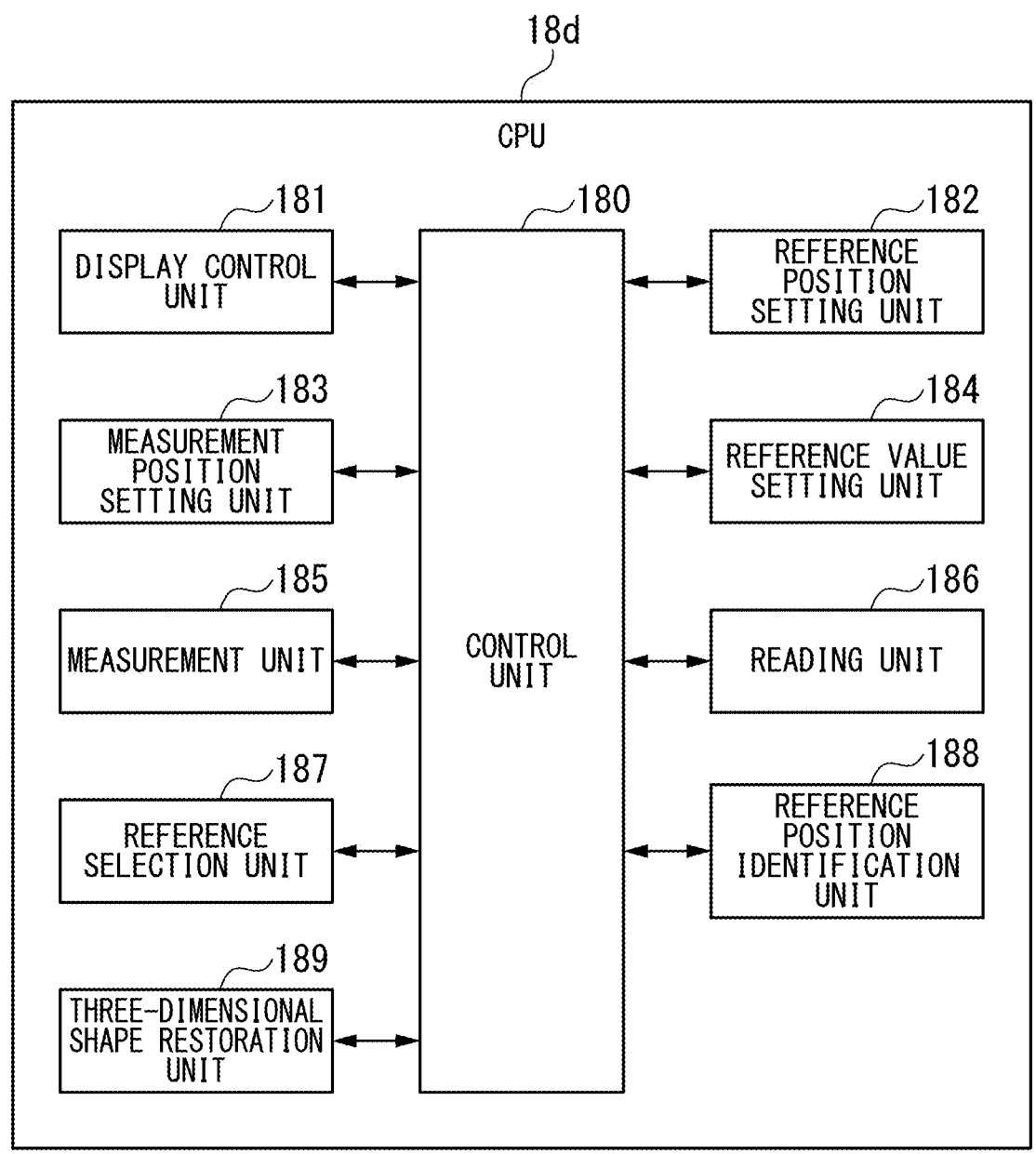
FIG. 23 is a block diagram showing a functional configuration of a CPU according to a sixth embodiment of the present invention.

In a sixth embodiment of the present invention, the CPU 18c shown in FIG. 16 is changed to a CPU 18d shown in FIG. 23. FIG. 23 shows a functional configuration of the CPU 18d. The same configuration as the configuration shown in FIG. 16 will not be described.

The CPU 18d includes a three-dimensional shape restoration unit 189 in addition to the components shown in FIG. 16. The imaging device 28 acquires a plurality of images of a subject. The three-dimensional shape restoration unit 189 restores a three-dimensional shape of the subject using, for example, SfM on the basis of the plurality of images. The three-dimensional shape restoration unit 189 generates three-dimensional data that represents the restored three-dimensional shape.

The three-dimensional data represents the position relationship between a plurality of points on a subject in the three-dimensional space. The three-dimensional data does not include data of a length (three-dimensional distance) between a plurality of points. A position of a point in the three-dimensional data restored by the three-dimensional shape restoration unit 189 and a position of a point in an image acquired by the imaging device 28 are associated with each other. The three-dimensional data restored by the three-dimensional shape restoration unit 189 forms a three-dimensional image (second image) of a subject. The three-dimensional shape restoration unit 189 may be included in the measurement unit 185. The display control unit 181 displays two-dimensional image (first image) of the subject or the three-dimensional image (second image) of the subject on the display unit 5.

Reference information is associated with a three-dimensional shape of a reference object including two reference positions. For example, the reference information is an image of the reference object acquired by the imaging device 28. The reference information may be a simple icon, an illustration, a computer-aided design (CAD) diagram, a text, or the like. The reference information is associated with three-dimensional data that represents the three-dimensional shape of the reference object. The reference position identification unit 188 identifies a similar region that is in the three-dimensional shape of the subject and is the most similar to the three-dimensional shape of the reference object, and identifies two reference positions of the similar region on the basis of the two reference positions of the three-dimensional shape of the reference object.

After the reference information is displayed on the display unit 5, the reference selection unit 187 selects one piece of reference information selected by a user from the reference information displayed on the display unit 5. The similar region is the most similar to the three-dimensional shape of the reference object associated with the reference information selected by the reference selection unit 187.

After the two-dimensional image of the subject or the three-dimensional image of the subject is displayed on the display unit 5 and the reference information is displayed on the display unit 5, the reference position setting unit 182 sets two reference positions on the three-dimensional image of the subject. After the two-dimensional image of the subject or the three-dimensional image of the subject is displayed on the display unit 5 and the reference information is displayed on the display unit 5, the measurement position setting unit 183 sets two or more measurement positions on the three-dimensional image of the subject. The measurement unit 185 measures a size of the subject on the basis of the two reference positions set on the three-dimensional image of the subject, the two or more measurement positions set on the three-dimensional image of the subject, and the reference value. The measurement unit 185 executes three-dimensional measurement of the subject using the three-dimensional shape of the subject restored by the three-dimensional shape restoration unit 189.

Figure 24:
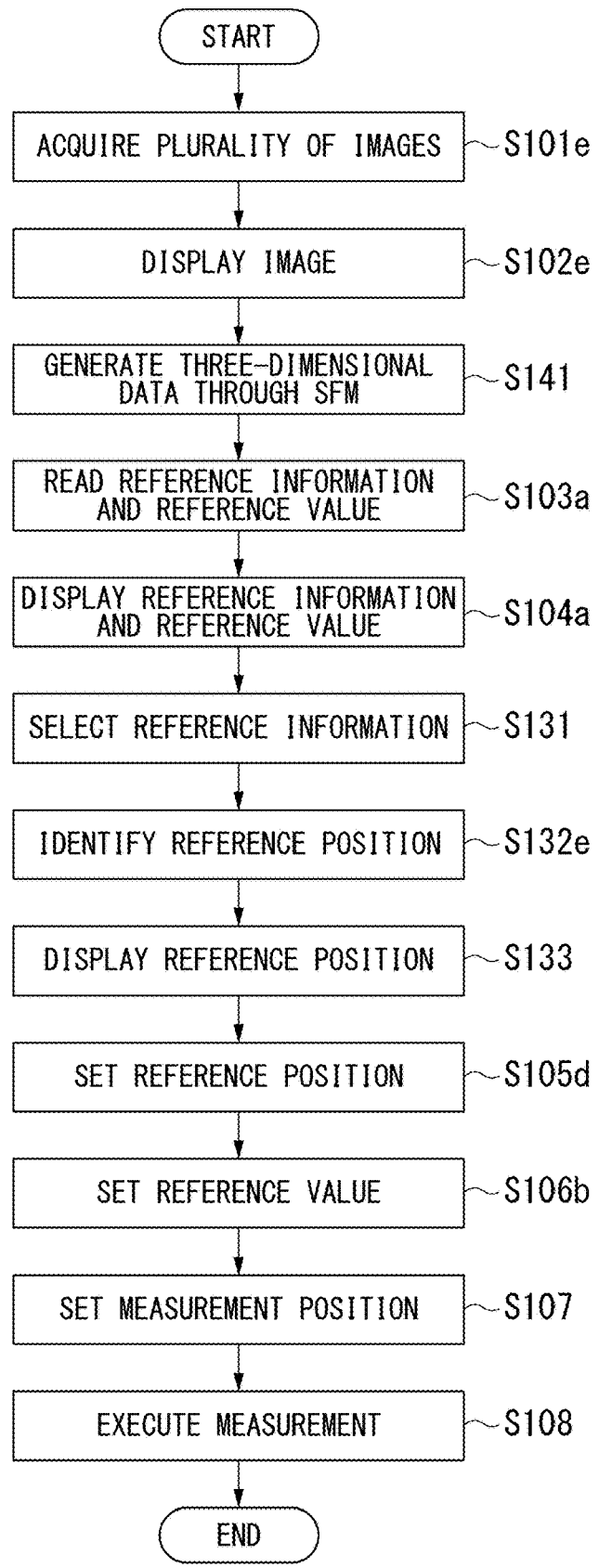
FIG. 24 is a flow chart showing a procedure of three-dimensional measurement in the sixth embodiment of the present invention.

Three-dimensional measurement in the sixth embodiment will be described using FIG. 24. FIG. 24 shows a procedure of the three-dimensional measurement. The same process as the process shown in FIG. 17 will not be described.

The imaging device 28 acquires a plurality of images of a subject by performing imaging of the subject a plurality of times (step S101*e*). In the plurality of times of imaging, positions of the imaging device 28 or postures of the imaging device 28 or both are different for each time of imaging. For example, in the plurality of times of imaging, positions of the imaging device 28 are different for each time of imaging or postures of the imaging device 28 are different for each time of imaging. In the plurality of times of imaging, positions of the imaging device 28 and postures of the imaging device 28 may be different for each time of imaging. The CPU 18*d* acquires the plurality of images from the CCU 9 through the video signal processing circuit 12.

A video signal corresponding to one of the plurality of images output from the CCU 9 is processed by the video signal processing circuit 12 and output to the display unit 5. The display control unit 181 displays an image of the subject based on the video signal on the display unit 5 (step S102*e*). In step S101*e*, the plurality of images are acquired and any one of the plurality of images is displayed in step S102*e*.

After step S102*e*, the three-dimensional shape restoration unit 189 restores a three-dimensional shape of the subject using SfM on the basis of the plurality of images and generates three-dimensional data that represents the three-dimensional shape (step S141). Step S141 corresponds to a restoration step. After step S141, the process of step S103*a* is executed.

After step S131, the reference position identification unit 188 identifies a reference position in the three-dimensional shape of the subject. For example, the reference position identification unit 188 performs alignment between the three-dimensional shape of the subject and a three-dimensional shape of a reference object. The three-dimensional shape of the reference object is associated with the reference information selected by the reference selection unit 187. Three-dimensional data that represents the three-dimensional shape of the reference object is stored in the RAM 14. In a case where the degree of matching between the three-dimensional shape of the subject and the three-dimensional shape of the reference object is the highest, each of positions of the three-dimensional shape of the subject and each of positions of the three-dimensional shape of the reference object are associated with each other. At this time, a similar region that is the most similar to the three-dimensional shape of the reference object in the three-dimensional shape of the subject is identified. The reference position identification unit 188 identifies two reference positions of the similar region. Further, the reference position identification unit 188 identifies two reference positions of a two-dimensional image of the subject corresponding to the two reference positions of the similar region (step S132*e*). After step S132*e*, the process of step S133 is executed.

Positions of the three-dimensional shape of the subject and positions of the two-dimensional image of the subject are associated with each other. The reference position identification unit 188 identifies two reference positions corresponding to two reference positions of the three-dimensional shape of the subject in the two-dimensional image displayed on the display unit 5.

The reference position identification unit 188 may perform rough alignment between the two-dimensional image of the subject and a two-dimensional image of the reference object, and thereafter may perform thorough alignment between the two-dimensional image of the subject and the two-dimensional image of the reference object. In this way, the reference position identification unit 188 can perform robust and fast alignment.

In step S105*d*, the reference position setting unit 182 sets the two reference positions identified by the reference position identification unit 188 on the three-dimensional shape (three-dimensional image) of the subject. Alternatively, in step S105*d*, the reference position setting unit 182 sets two reference positions designated by a user on the three-dimensional shape of the subject. In step S106*b*, the reference value setting unit 184 sets a reference value associated with the reference information selected by the reference selection unit 187 to the three-dimensional shape of the subject.

In step S107, the measurement position setting unit 183 sets two or more measurement positions designated by a user on the three-dimensional shape of the subject. In step S108, the measurement unit 185 measures a size of the subject on the basis of the two or more measurement positions, the two reference positions, and the reference value by using the three-dimensional shape of the subject.

A reference value may not be read in step S103*a*. A reference value may not be displayed in step S104*a*. Instead of the process of step S106*b*, the process of step S106 shown in FIG. 4 may be executed. The process of step S106*b* may be executed between the process of step S131 and the process of step S105d. The process of step S106b may be executed between the process of step S107 and the process of step S108.

An example in which a subject is a pipe will be described. The shape of a subject and a reference object is a cylinder and reference positions are two points that represent the diameter of the inside of the cylinder. Information that represents two reference positions of the reference object is associated with three-dimensional data of the reference object. The reference position identification unit 188 identifies two reference positions of the subject corresponding to the two reference positions of the reference object on the three-dimensional data of the subject after performing alignment.

In a case where the shape of the subject is a complicated curved surface or the like, the reference position identification unit 188 performs the above-mentioned alignment. In a case where the shape of the subject is a simple geometric shape, the reference position identification unit 188 calculates a coefficient of an expression that represents the shape of the subject through fitting. For example, in a case where the shape of the subject and a reference object is a cylinder, the reference position identification unit 188 calculates a coefficient of an expression that represents the cylinder of the subject. Three-dimensional data of a reference object is an expression that represents a cylinder. The reference position identification unit 188 identifies an expression that is the most similar to the expression of the subject among expressions of a plurality of reference objects.

Figure 25:
FIG. 25 is a diagram showing three-dimensional data of a subject in the sixth embodiment of the present invention.
Figure 26:
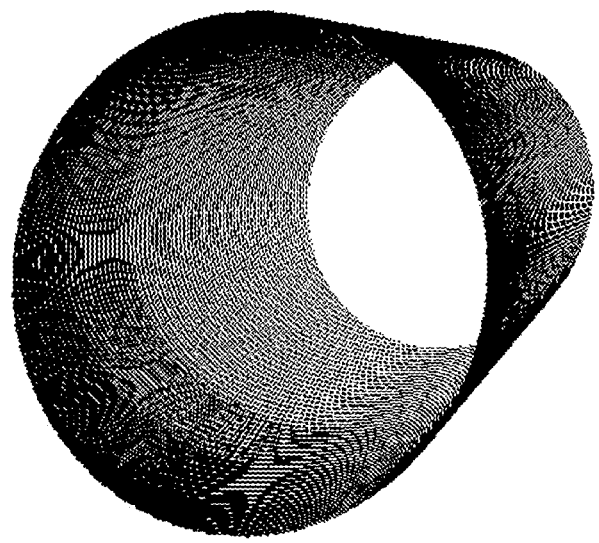
FIG. 26 is a diagram showing three-dimensional data of an object including a reference object in the sixth embodiment of the present invention.
Figure 27:
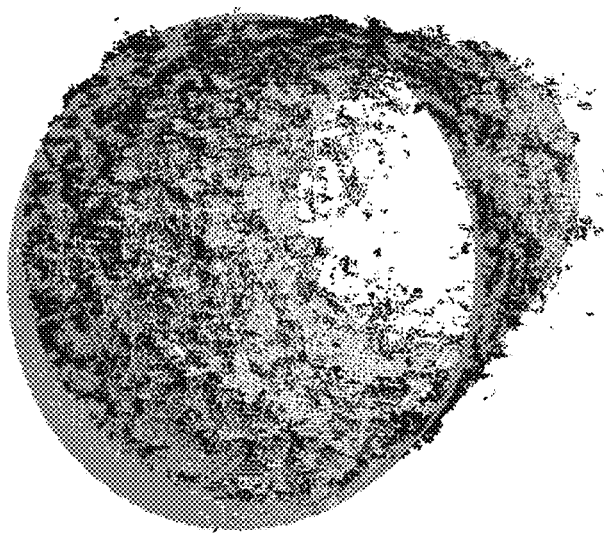
FIG. 27 is a diagram showing a result of alignment in the sixth embodiment of the present invention.

For example, the reference position identification unit 188 performs alignment between three-dimensional data shown in FIG. 25 and three-dimensional data shown in FIG. 26. FIG. 25 shows three-dimensional data of a subject generated by the three-dimensional shape restoration unit 189. FIG. 26 shows three-dimensional data of an object including a reference object. For example, the reference position identification unit 188 performs alignment using the interactive closest point (ICP). FIG. 27 shows the result of the alignment. As the result of this alignment, the difference between the three-dimensional data of the subject and the three-dimensional data of the reference object becomes small. An algorism used for alignment of three-dimensional data is not limited to ICP. After the alignment is performed, the reference position identification unit 188 identifies two reference positions of the subject that are the nearest to two reference positions of the reference object.

Figure 28:
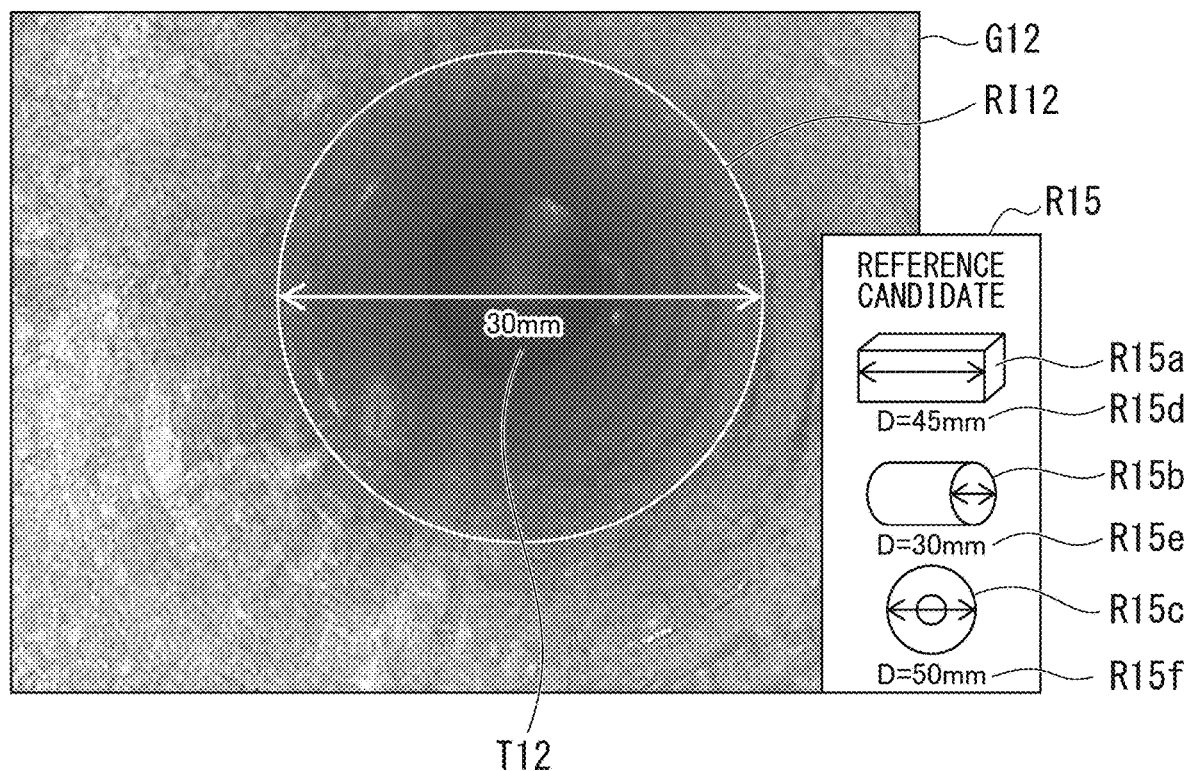
FIG. 28 is a diagram showing an example of an image displayed on a display unit according to the sixth embodiment of the present invention.

FIG. 28 shows an example of an image displayed on the display unit 5. In step S102e, an image G12 is displayed. In step S104a, a reference candidate R15 is displayed. The reference candidate R15 includes reference information R15a, reference information R15b, reference information R15c, a reference value R15d, a reference value R15e, and a reference value R15f. Each of pieces of reference information is an illustration of a reference object. In each of pieces of reference information, two reference positions are suggested by an arrow.

Each of the reference values represents a length (three-dimensional distance) between two reference positions. The reference value R15d is associated with the reference information R15a. The reference value R15e is associated with the reference information R15b. The reference value R15f is associated with the reference information R15c.

In step S131, a user designates one of three pieces of reference information included in the reference candidate R15. For example, a user designates the reference information R15b. The reference selection unit 187 selects the reference information R15b. In step S132e, the reference position identification unit 188 identifies a reference position on the image G12. In other words, the reference position identification unit 188 performs alignment between three-dimensional data corresponding to the image G12 and three-dimensional data of a reference object associated with the reference information R15b. After the alignment is performed, the reference position identification unit 188 identifies two reference positions of the subject that are the nearest to two reference positions of the reference object.

Further, the reference position identification unit 188 identifies two reference positions of a two-dimensional image corresponding to the two reference positions of the three-dimensional data. In step S133, reference position information RI12 is displayed on the image G12. The reference position information RI12 includes a circle that represents a cylinder that is a reference object and an arrow that represents two reference positions. The reference positions are two points that define the diameter. A text T12 for notifying a user of the reference value R15e associated with the reference information R15b is displayed near the reference positions.

Figure 29:
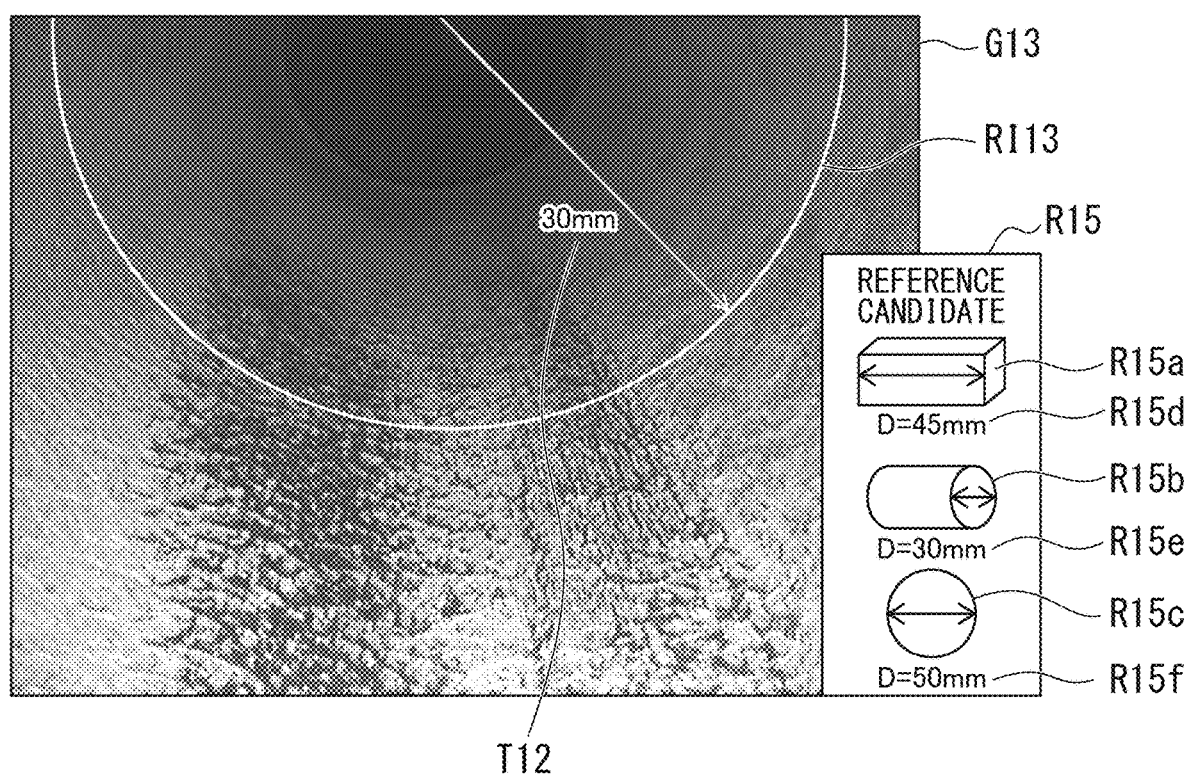
FIG. 29 is a diagram showing an example of an image displayed on the display unit according to the sixth embodiment of the present invention.

FIG. 29 shows another example of an image displayed on the display unit 5. The same part as the part shown in FIG. 28 will not be described.

An image G13 is displayed instead of the image G12. Reference position information RI13 is displayed instead of the reference position information RI12. The reference position information RI13 includes part of a circle that represents a cylinder that is a reference object and part of an arrow that represents two reference positions. Only part of a subject that is a cylinder is seen in the image G13. Three-dimensional data of the subject generated by the three-dimensional shape restoration unit 189 includes data of only part of the subject. Even when only part of a cylinder is lacking, alignment between the three-dimensional data of the subject and three-dimensional data of a reference object can be performed. For this reason, the reference position identification unit 188 can estimate two reference positions that define the diameter. The entire inner circumference does not need to be seen in an image. For this reason, there are few restrictions when an image is acquired.

In the sixth embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

The reference position identification unit 188 identifies two reference positions in a three-dimensional shape of a subject. For example, it is difficult for the reference position identification unit 188 to detect the diameter of the inside of a cylinder on the basis of a two-dimensional image. The reference position identification unit 188 can accurately detect two reference positions by using a three-dimensional shape of a subject. A user may modify the two reference positions identified by the reference position identification unit 188.

For example, three-dimensional data is acquired through measurement based on SfM or the stereo measurement method. Three-dimensional data may be acquired through measurement based on another method. For example, three-dimensional data may be acquired through measurement based on the phase-shift method or the random-pattern-projection method. In the measurement based on the phase-shift method, an image of a subject on which plurality of stripe patterns having different spatial phases are projected is used. In the measurement based on the random-pattern-projection method, an image of a subject on which random patterns are projected is used. In the measurement based on the phase-shift method or the random-pattern-projection method, a first image and an image for generating three-dimensional data are acquired. An image of a subject on which a pattern is not projected is used as the first image or the second image.

Modified Example of Sixth Embodiment

Figure 30:
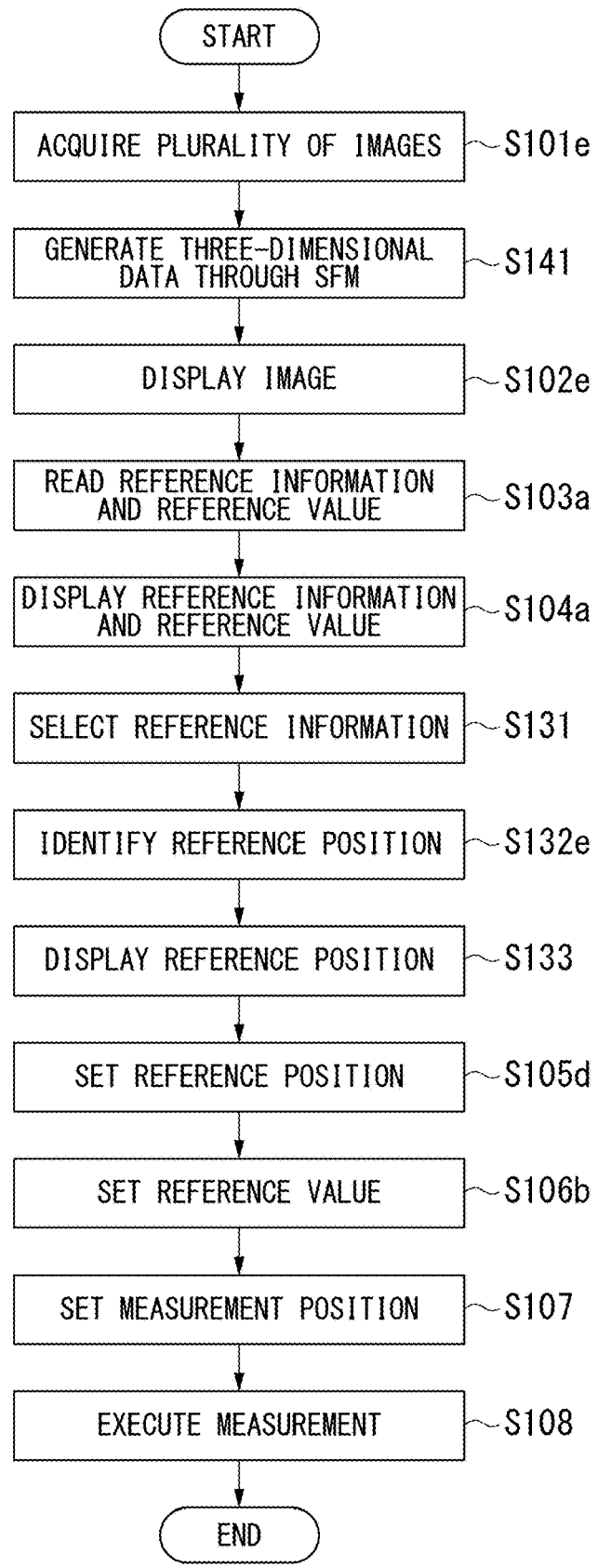
FIG. 30 is a flow chart showing a procedure of three-dimensional measurement in a modified example of the sixth embodiment of the present invention.

Three-dimensional measurement in a modified example of the sixth embodiment of the present invention will be described using FIG. 30. FIG. 30 shows a procedure of the three-dimensional measurement. The same process as the process shown in FIG. 24 will not be described.

After step S101e, the process of step S141 is executed. After step S141, the display control unit 181 displays a three-dimensional of a subject generate by the three-dimensional shape restoration unit 189 on the display unit 5. In other words, the display control unit 181 displays an image (three-dimensional image) based on three-dimensional data of the subject on the display unit 5 (step S102e). After step S102e, the process of step S103a is executed.

In step S104a, reference information and a reference value are displayed on the three-dimensional image. In step S133, reference position information that represents two reference positions is displayed on the three-dimensional image.

A reference value may not be read in step S103a. A reference value may not be displayed in step S104a. Instead of the process of step S106b, the process of step S106 shown in FIG. 4 may be executed. The process of step S106b may be executed between the process of step S131 and the process of step S105d. The process of step S106b may be executed between the process of step S107 and the process of step S108.

FIGS. 31 to 35 show examples of images displayed on the display unit 5 in step S107. Images shown in FIGS. 31 to 35 are three-dimensional images of a subject. Reference position information RI14 and a text T13 are displayed on the images.

Figure 31:
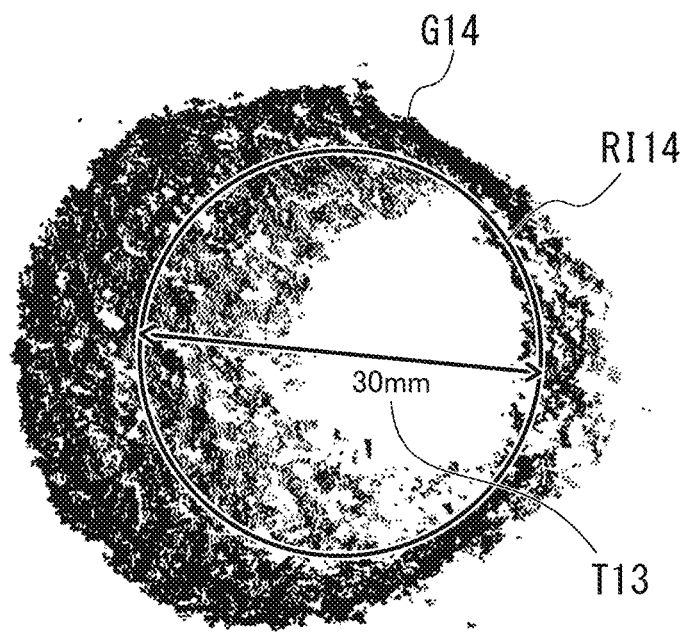
FIG. 31 is a diagram showing an example of a three-dimensional image of a subject displayed on a display unit according to the modified example of the sixth embodiment of the present invention.
Figure 32:
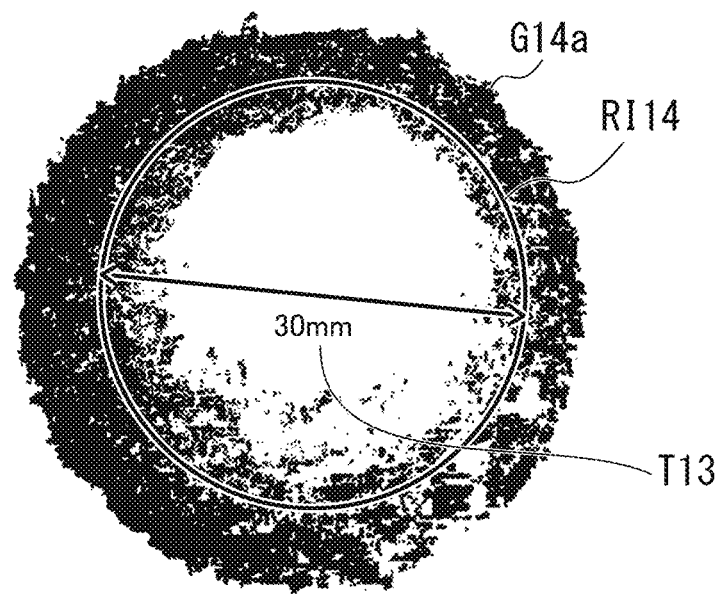
FIG. 32 is a diagram showing an example of a three-dimensional image of a subject displayed on the display unit according to the modified example of the sixth embodiment of the present invention.
Figure 33:
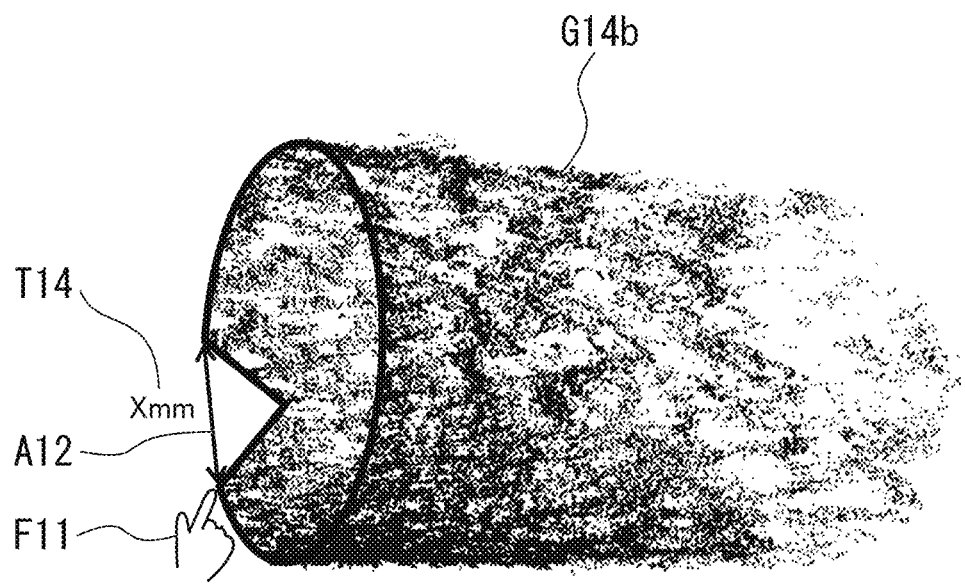
FIG. 33 is a diagram showing an example of a three-dimensional image of a subject displayed on a display unit according to the modified example of the sixth embodiment of the present invention.

A user can change a view point of a three-dimensional image by performing a swipe operation or the like on a touch panel. For example, an image G14 shown in FIG. 31 is changed to an image G14a shown in FIG. 32 by changing a view point. By changing a view point, a user can easily confirm a shape of a subject. The image G14a shown in FIG. 32 is changed to an image G14b shown in FIG. 33 by additionally changing a view point. A user designates two measurement positions in the image G14b. For example, a user touches each of the two measurement positions with a finger F11. An arrow that represents the two measurement positions is displayed on the image G14b and a text T14 that represents the measurement result is displayed on the image G14b.

Figure 34:
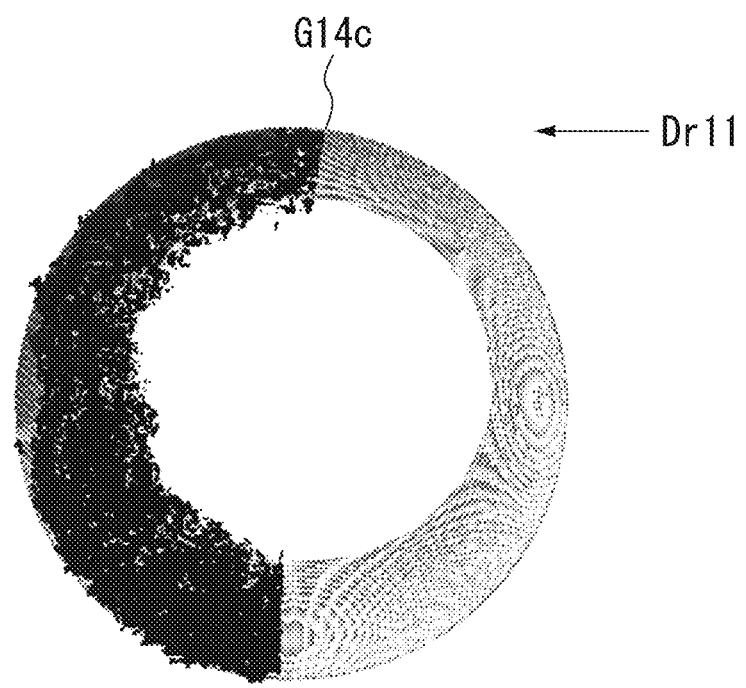
FIG. 34 is a diagram showing an example of a three-dimensional image of a subject displayed on the display unit according to the modified example of the sixth embodiment of the present invention.
Figure 35:
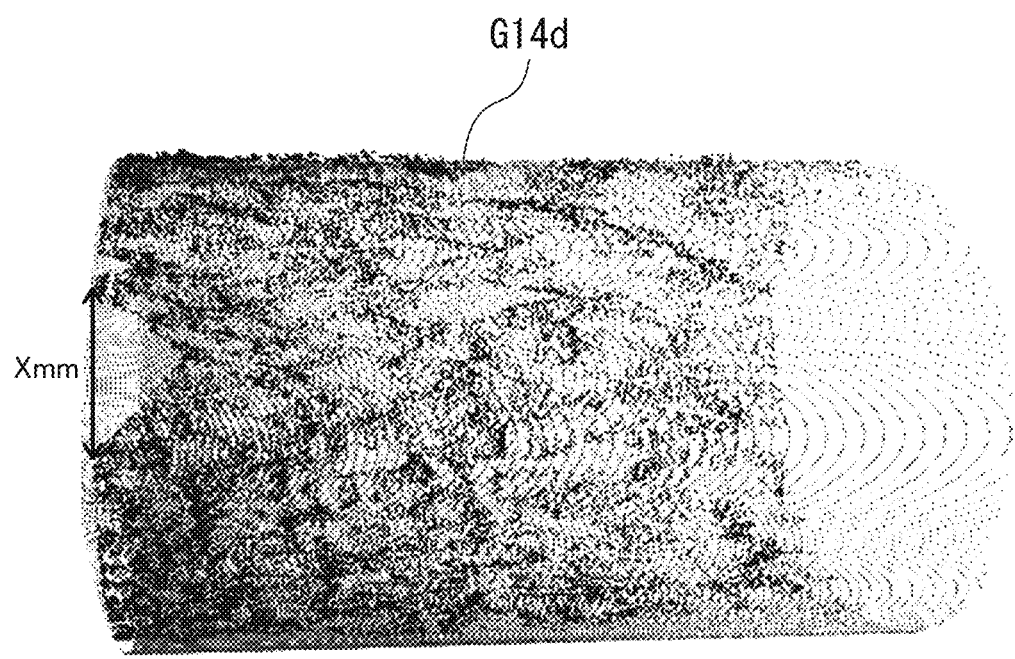
FIG. 35 is a diagram showing an example of a three-dimensional image of a subject displayed on the display unit according to the modified example of the sixth embodiment of the present invention.

An image G14c shown in FIG. 34 may be displayed. In the image G14c, part of a three-dimensional image is transparently displayed. An image G14c shown in FIG. 34 is changed to an image G14d shown in FIG. 35 by changing a view point. The FIG. G14d represents a state in which a subject is seen in a direction Dr11 shown in FIG. 34. Since part of a three-dimensional image is transparently displayed, the part that a user desires to observe is seen. The display control unit 181 may hide part of a three-dimensional image instead of transparently displaying part of the three-dimensional image.

Seventh Embodiment

An endoscope device 1 according to a seventh embodiment of the present invention includes the CPU 18c shown in FIG. 16.

Figure 36:
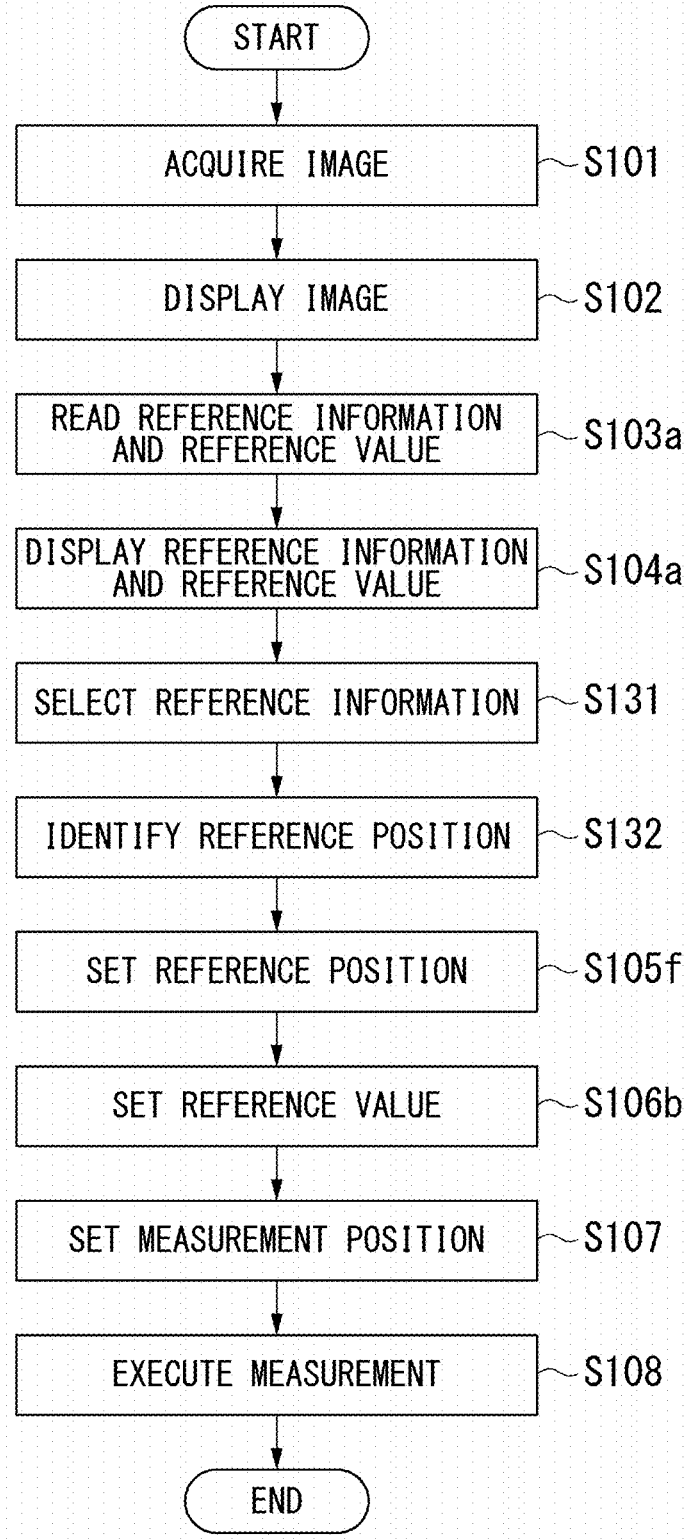
FIG. 36 is a flow chart showing a procedure of three-dimensional measurement in a seventh embodiment of the present invention.

Three-dimensional measurement in the seventh embodiment will be described using FIG. 36. FIG. 36 shows a procedure of the three-dimensional measurement. The same process as the process shown in FIG. 17 will not be described.

Step S105d shown in FIG. 17 is changed to step S105f. The process of step S133 shown in FIG. 17 is not executed. After step S132, the reference position setting unit 182 sets two reference positions identified by the reference position identification unit 188 on an image (step S105f). After step S105f, the process of step S106b is executed. In step S105d shown in FIG. 17, a user determines whether or not to designate the two reference positions identified by the reference position identification unit 188. In step S105f shown in FIG. 36, determination by a user is not necessary.

A reference value may not be read in step S103a. A reference value may not be displayed in step S104a. Instead of the process of step S106b, the process of step S106 shown in FIG. 4 may be executed. The process of step S106b may be executed between the process of step S131 and the process of step S105f. The process of step S106b may be executed between the process of step S107 and the process of step S108.

Step S133 and step S105d shown in FIG. 24 or FIG. 30 may be changed to step S105f.

In the seventh embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

The reference position identification unit 188 identifies two reference positions in an image. For this reason, a user's time and effort to designate two reference positions are eliminated. Since reference positions are identified through an image processing, the reference position setting unit 182 can accurately set two reference positions. For example, the reference position setting unit 182 can set the two reference positions at a sub-pixel level. A user may modify the two reference positions identified by the reference position identification unit 188.

The display control unit 181 displays reference position information that represents the two reference positions identified by the reference position identification unit 188 on the display unit 5. For this reason, the endoscope device 1 can notify a user of two reference positions. A user can easily understand two reference positions on the basis of the displayed reference position information.

Eighth Embodiment

Figure 37:
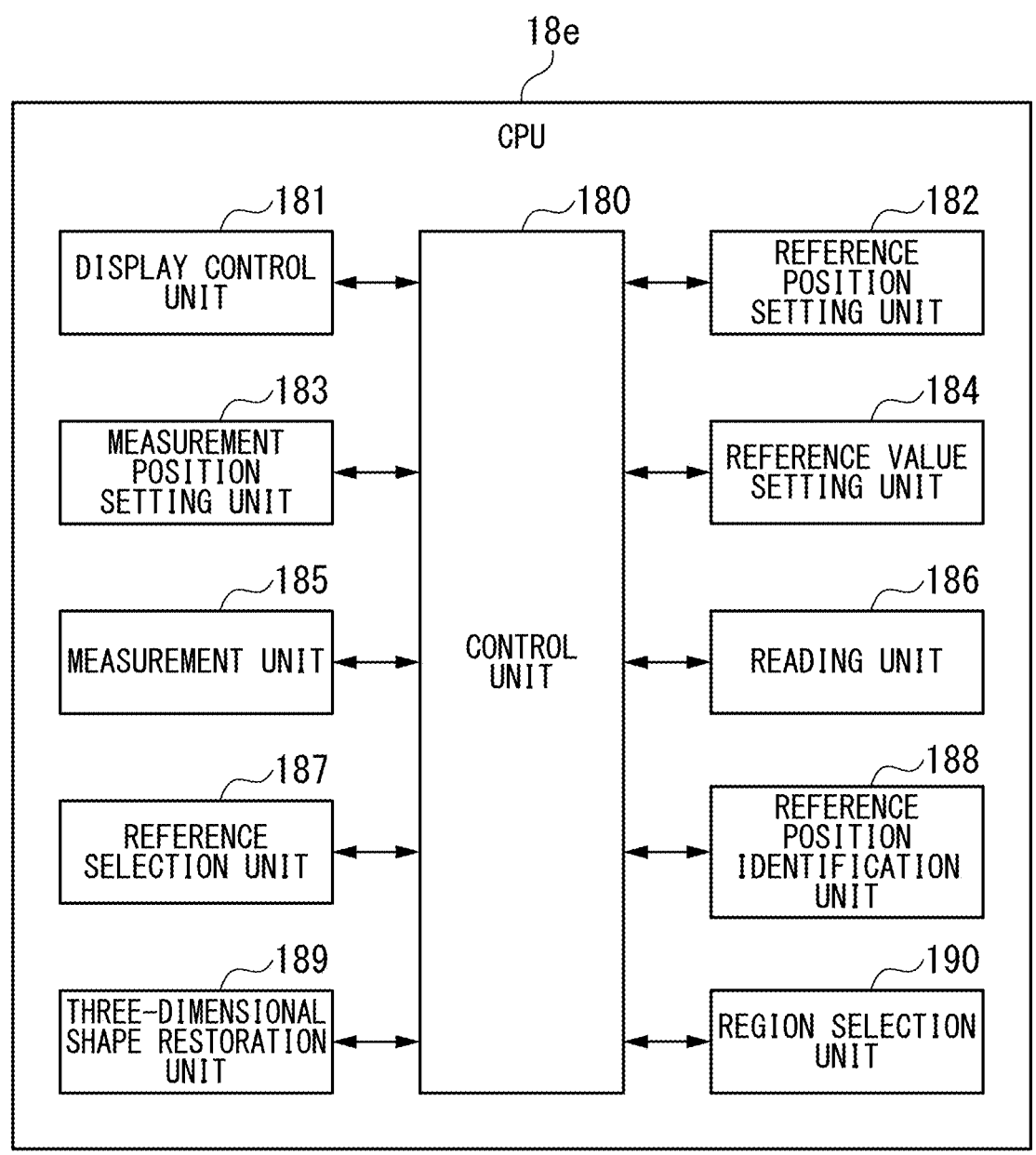
FIG. 37 is a block diagram showing a functional configuration of a CPU according to an eighth embodiment of the present invention.

In an eighth embodiment of the present invention, the CPU 18d shown in FIG. 23 is changed to a CPU 18e shown in FIG. 37. FIG. 37 shows a functional configuration of the CPU 18e. The same configuration as the configuration shown in FIG. 23 will not be described.

The CPU 18e includes a region selection unit 190 in addition to the components shown in FIG. 23. Reference information is an image of a reference object including two reference positions. The region selection unit 190 selects a region designated by a user in a first image or a second image displayed on the display unit 5 as a designation region. The reference position identification unit 188 identifies an image of a reference object that is the most similar to a designation region, and identifies two reference positions of the designation region on the basis of the two reference positions of the identified image.

Figure 38:
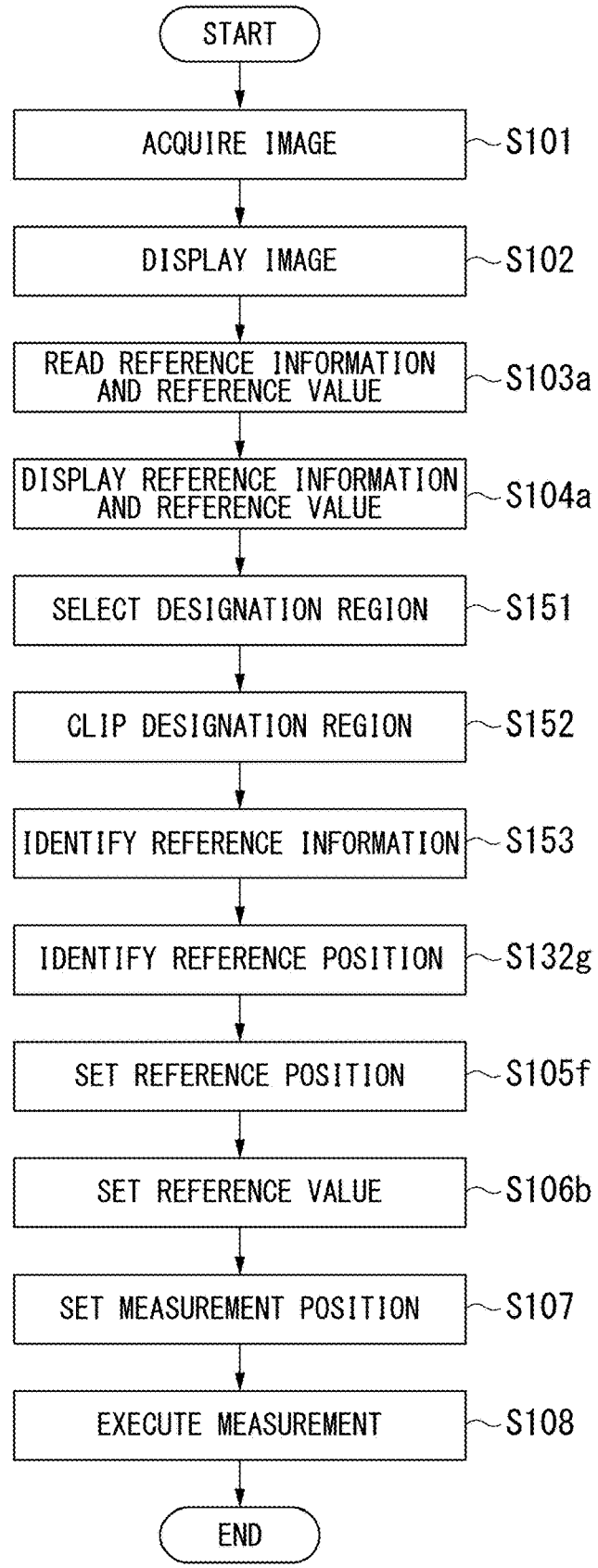
FIG. 38 is a flow chart showing a procedure of three-dimensional measurement in the eighth embodiment of the present invention.

Three-dimensional measurement in the eighth embodiment will be described using FIG. 38. FIG. 38 shows a procedure of the three-dimensional measurement. The same process as the process shown in FIG. 36 will not be described.

After step S104a, the region selection unit 190 determines a region designated by a user on the basis of the operation result of the operation unit 4. The region selection unit 190 selects the region designated by a user in an image displayed on the display unit 5 as a designation region (step S151). Step S151 corresponds to a selection step.

In step S104a, an image of a reference object is displayed as reference information. A user designates a rough position of a reference object on the image of a subject with reference to the image of the reference object displayed on the display unit 5. A user inputs information that designates a region on the image by operating the operation unit 4. For example, a user touches a position of a region that the user desires to designate in the image displayed on the display unit 5. The operation unit 4 accepts information that is input to the operation unit 4 by a user and outputs the information. The information input to the operation unit 4 is input to the control interface 17. The information input to the control interface 17 is input to the CPU 18e. In step S151, the region selection unit 190 selects a designation region represented by the information input to the CPU 18e. For example, the region selection unit 190 selects a region having a predetermined size and whose center is positioned at the position designated by a user.

After step S151, the reference position identification unit 188 clips the designation region from the image displayed on the display unit 5 (step S152).

After step S152, the reference position identification unit 188 identifies reference information that is included in one or more pieces of reference information displayed on the display unit 5 and is the most similar to the designation region. Specifically, the reference position identification unit 188 identifies an image that is included in images of one or more reference objects displayed on the display unit 5 and is the most similar to the designation region (step S153). Step S153 corresponds to an identification step.

As a method of detecting a designation region, the template matching or the like can be used. For example, the reference position identification unit 188 calculates the similarity between the designation region and each of images of a plurality of reference objects. The reference position identification unit 188 identifies an image of a reference object having the highest similarity. When the similarity is less than or equal to a threshold value set in advance, the endoscope device 1 may notify a user that an image of an appropriate reference object cannot be identified. In this way, use of a wrong reference object can be avoided.

After step S153, the reference position identification unit 188 identifies two reference positions in the designation region. For example, the reference position identification unit 188 executes a matching process between the designation region and the image of a reference object identified in step S153. In this way, alignment between the designation region and the image of the reference object is performed. After the alignment is performed, the reference position identification unit 188 identifies two reference positions in the designation region (step S132g). After step S132g, the process of step S105f is executed.

A reference value may not be read in step S103a. A reference value may not be displayed in step S104a. Instead of the process of step S106b, the process of step S106 shown in FIG. 4 may be executed. The process of step S106b may be executed between the process of step S104a and the process of step S105f. The process of step S106b may be executed between the process of step S107 and the process of step S108. The reference information identified in step S153 may be highlighted.

Step S131, step S132e, step S133, and step S105d shown in FIG. 30 may be changed to step S151, step S152, step S153, step S132g, and step S105f.

Figure 39:
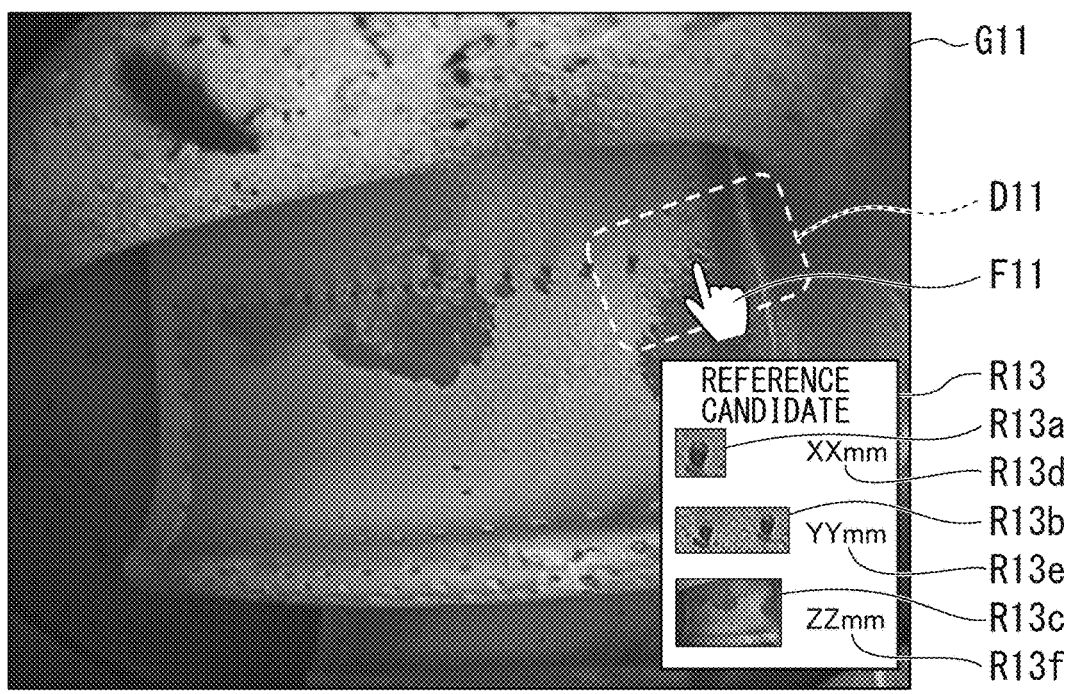
FIG. 39 is a diagram showing an example of an image displayed on a display unit according to the eighth embodiment of the present invention.
Figure 40:
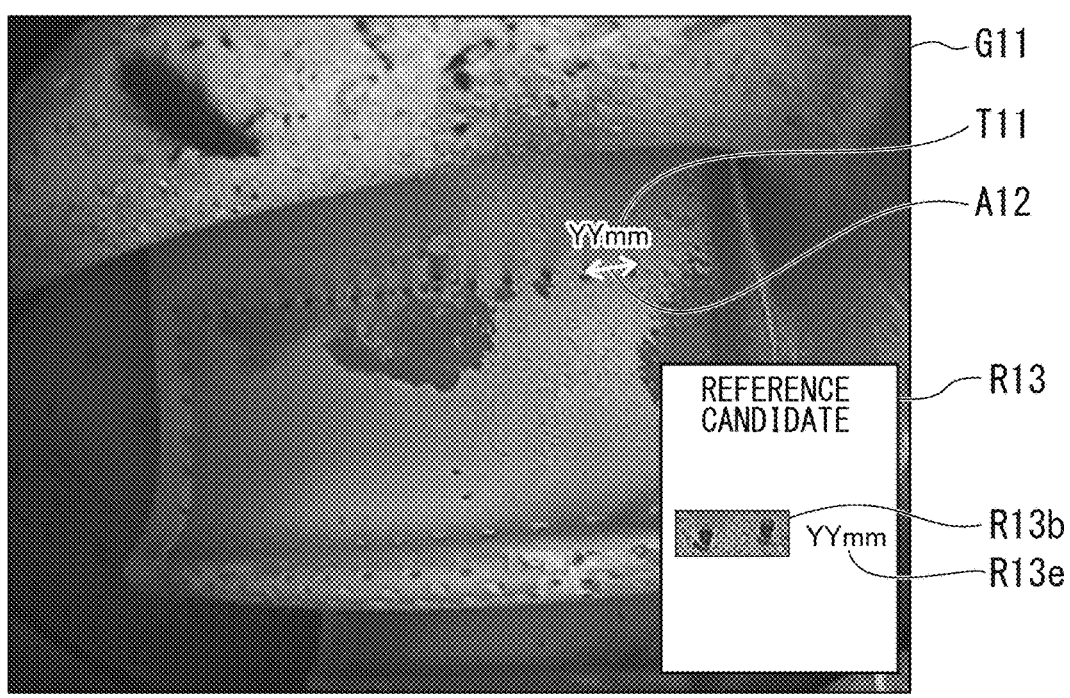
FIG. 40 is a diagram showing an example of an image displayed on the display unit according to the eighth embodiment of the present invention.

FIG. 18, FIG. 39, and FIG. 40 show examples of images displayed on the display unit 5. In step S102, an image G11 shown in FIG. 18 is displayed. In step S104a, a reference candidate R13 shown in FIG. 18 is displayed on the image G11. The reference candidate R13 is the same as the reference candidate R13 shown in FIG. 8.

In step S151, a user designates a rough position of a reference object on the image G11. For example, a user touches the position with a finger F11 (FIG. 39). In step S152, the region selection unit 190 selects a designation region D11 designated by a user.

In step S153, the reference position identification unit 188 identifies reference information on the basis of the designation region D11. In other words, the reference position identification unit 188 identifies reference information R13b having the highest similarity with the designation region D11.

In step S132g, the reference position identification unit 188 identifies two reference positions of the designation region D11 on the basis of the reference information R13b. In step S105f, the reference position setting unit 182 sets the two reference positions identified by the reference position identification unit 188 on the image G11.

In step S106b, a reference value associated with the reference information identified by the reference position identification unit 188 is automatically set to the image G11. An arrow A12 is displayed on the image G11. The arrow A12 represents two reference positions set on the image G11. A text T11 for notifying a user of the reference value R13e associated with the reference information R13b is displayed near the two reference positions (FIG. 40).

In the eighth embodiment, reference information and a reference value are displayed on the display unit 5. For this reason, the endoscope device 1 can notify a user of two reference positions and a reference value. A user can easily search for two reference positions on an image on the basis of the displayed reference information. Since the reference value is displayed, a user's time and effort to look up the reference value are eliminated.

The reference position identification unit 188 identifies an image of a reference object that is the most similar to a designation region designated by a user, and identifies two reference positions of the designation region on the basis of two reference positions of the identified image. For this reason, a user's time and effort to designate two reference positions are eliminated. The reference position identification unit 188 has only to search only a designation region for two reference positions. For this reason, the probability of generating the mismatch is suppressed considerably low. Since reference positions are identified through an image processing, the reference position setting unit 182 can accurately set two reference positions. For example, the reference position setting unit 182 can set the two reference positions at a sub-pixel level. A user may modify the two reference positions identified by the reference position identification unit 188.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of operating a measurement device, the method comprising:
   an image acquisition step in which an image acquisition unit acquires a first image of a subject;
   a first display step in which a display control unit displays the first image or a second image regarding the first image on a display;
   a reading step in which a reading unit reads one or more pieces of reference information from a storage medium, the reference information representing two reference positions on the subject, the two reference positions defining a reference value of a length and/or area of a first portion of the subject, wherein the storage medium stores the one or more pieces of reference information and the reference value is a known value;
   a second display step in which the display control unit displays the one or more pieces of reference information on the display;
   a setting step in which a setting unit sets two measurement reference positions on the first image or the second image after the first image or the second image is displayed on the display and the reference information is displayed on the display, wherein the measurement reference positions represent the same positions on the subject as the respective two reference positions represented by any one of the one or more pieces of reference information;
   a measurement position setting step in which the setting unit sets two or more measurement positions that are any positions on the first image or the second image on which the two reference positions are set; and
   a measurement step in which a measurement unit measures a length and/or area of a second portion of the subject corresponding to the two or more measurement positions on the basis of the two measurement reference positions, the two or more measurement positions and the reference value.

2. The method of operating the measurement device according to claim 1,
   wherein the reference value is associated with the reference information, and
   the display control unit displays the reference information and the reference value on the display in the second display step.

3. The method of operating the measurement device according to claim 1, further comprising a selection step in which a selection unit selects one piece of reference information designated by a user from the reference information displayed on the display,
   wherein the reference value is associated with the reference information, and
   the measurement unit uses the reference value associated with the reference information selected by the selection unit in the measurement step.

4. The method of operating the measurement device according to claim 1,
   wherein the storage medium is configured to store the one or more pieces of reference information for each of a plurality of subjects,
   the reading unit reads the one or more pieces of reference information for one subject included in the plurality of subjects from the storage medium on the basis of information of the one subject in the reading step.

5. The method of operating the measurement device according to claim 1, further comprising an identification step in which an identification unit identifies the two measurement reference positions in the first image or the second image.

6. The method of operating the measurement device according to claim 5, further comprising a third display step in which the display control unit displays reference position information that represents the two measurement reference positions identified by the identification unit on the display.

7. The method of operating the measurement device according to claim 5, wherein the reference information is an image of a reference object including the two reference positions.

8. The method of operating the measurement device according to claim 7, wherein the identification unit identifies a similar region that is in the first image or the second image and is the most similar to the image of the reference object, and identifies the two reference positions of the similar region on the basis of the two reference positions of the image of the reference object in the identification step.

9. The method of operating the measurement device according to claim 5, further comprising a restoration step in which a restoration unit restores a three-dimensional shape of the subject,
   wherein the reference information is associated with a three-dimensional shape of a reference object including the two reference positions, and
   the identification unit identifies a similar region that is in the three-dimensional shape of the subject and is the most similar to the three-dimensional shape of the reference object, and identifies the two reference positions of the similar region on the basis of the two reference positions of the three-dimensional shape of the reference object in the identification step.

10. The method of operating the measurement device according to claim 7, further comprising a selection step in which a selection unit selects a region designated by a user in the first image or the second image displayed on the display as a designation region,
    wherein the identification unit identifies the image of the reference object that is the most similar to the designation region, and identifies the two reference positions of the designation region on the basis of the two reference positions of the identified image in the identification step.

11. A measurement device comprising:
    an image acquisition unit configured to acquire a first image of a subject;

a reading unit configured to read one or more pieces of reference information from a storage medium, the reference information representing two reference positions on the subject, the two reference positions defining a reference value of a length and/or area of a first portion of the subject, wherein the storage medium stores the one or more pieces of reference information and the reference value is a known value;

a display control unit configured to display the first image or a second image regarding the first image on a display, and display the one or more pieces of reference information on the display;

a setting unit configured to:
  set two measurement reference positions on the first image or the second image after the first image or the second image is displayed on the display and the reference information is displayed on the display, wherein the measurement reference positions represent the same positions on the subject as the respective two reference positions represented by any one of the one or more pieces of reference information; and
  set two or more measurement positions that are any positions on the first image or the second image on which the two reference positions are set; and a measurement unit configured to measure a length and/or area of a second portion of the subject corresponding to the two or more measurement positions on the basis of the two measurement reference positions, the two or more measurement positions and the reference value.

12. The measurement device according to claim 11, wherein the reference value is associated with the reference information, and
the display control unit is configured to display the reference information and the reference value on the display.

13. The measurement device according to claim 11, further comprising a selection unit configured to select one piece of reference information designated by a user from the reference information displayed on the display,
wherein the reference value is associated with the reference information, and
the measurement unit is configured to use the reference value associated with the reference information selected by the selection unit.

14. The measurement device according to claim 11, wherein the storage medium is configured to store the one or more pieces of reference information for each of a plurality of subjects,
the reading unit is configured to read the one or more pieces of reference information for one subject included in the plurality of subjects from the storage medium on the basis of information of the one subject.

15. The measurement device according to claim 11, further comprising an identification unit configured to identify the two measurement reference positions in the first image or the second image.

16. The measurement device according to claim 15, wherein the reference information is an image of a reference object including the two reference positions.

17. The measurement device according to claim 16, wherein the identification unit is configured to identify a similar region that is in the first image or the second image and is the most similar to the image of the reference object, and identify the two reference positions of the similar region on the basis of the two reference positions of the image of the reference object.

18. The measurement device according to claim 15, further comprising a restoration unit configured to restore a three-dimensional shape of the subject,
wherein the reference information is associated with a three-dimensional shape of a reference object including the two reference positions, and
the identification unit is configured to identify a similar region that is in the three- dimensional shape of the subject and is the most similar to the three-dimensional shape of the reference object, and identify the two reference positions of the similar region on the basis of the two reference positions of the three-dimensional shape of the reference object.

19. The measurement device according to claim 16, further comprising a selection unit configured to select a region designated by a user in the first image or the second image displayed on the display as a designation region,
wherein the identification unit is configured to identify the image of the reference object that is the most similar to the designation region, and identify the two reference positions of the designation region on the basis of the two reference positions of the identified image.

20. A non-transitory computer-readable recording medium having a program stored thereon for causing a computer to execute:
an image acquisition step of acquiring a first image of a subject;
a first display step of displaying the first image or a second image regarding the first image on a display;
a reading step of reading one or more pieces of reference information from a storage medium, the reference information representing two reference positions on the subject, the two reference positions defining a reference value of a length and/or area of a first portion of the subject, wherein the storage medium stores the one or more pieces of reference information and the reference value is a known value;
a second display step of displaying the one or more pieces of reference information on the display;
a setting step of setting two measurement reference positions on the first image or the second image after the first image or the second image is displayed on the display and the reference information is displayed on the display, wherein the measurement reference positions represent the same positions on the subject as the respective two reference positions represented by any one of the one or more pieces of reference information;
a measurement position setting step in which the setting unit sets two or more measurement positions that are any positions on the first image or the second image on which the two reference positions are set; and
a measurement step of measuring a length and/or area of a second portion of the subject corresponding to the two or more measurement positions on the basis of the two measurement reference positions, the two or more measurement positions and the reference value.

* * * * *